United States Patent

Kandiew

[15] 3,692,989

[45] Sept. 19, 1972

[54] COMPUTER DIAGNOSTIC WITH INHERENT FAIL-SAFETY

[72] Inventor: Anatoly I. Kandiew, Wantagh, N.Y.

[73] Assignee: The United States of America as represented by the United States Atomic Energy Commission

[22] Filed: Oct. 14, 1970

[21] Appl. No.: 80,651

[52] U.S. Cl...............................235/153, 340/172.5

[51] Int. Cl.................................................G06f 11/00

[58] Field of Search.........235/153; 340/146.1, 172.5

[56] References Cited

UNITED STATES PATENTS

| | | | |
|---|---|---|---|
| 3,387,276 | 6/1968 | Reichow | 340/172.5 |
| 3,348,197 | 10/1967 | Akers, Jr. et al | 235/153 X |
| 3,377,623 | 4/1968 | Reut et al. | 340/172.5 |
| 3,409,877 | 11/1968 | Alterman et al. | 340/172.5 |
| 3,451,042 | 6/1969 | Jensen et al. | 340/146.1 X |
| 3,510,845 | 5/1970 | Couleur et al. | 340/172.5 |
| 3,517,171 | 6/1970 | Avizienis | 235/153 |
| 3,519,808 | 7/1970 | Lawder | 235/153 |

OTHER PUBLICATIONS

Downing et al., No. 1 ESS Maintenance Plan, The Bell System Technical Journal, September 1964, pp. 1961–2019.

*Primary Examiner*—Charles E. Atkinson
*Attorney*—Roland A. Anderson

[57] ABSTRACT

Time-saving, effective and efficient diagnostic means and method for the Brooknet shared time computer system for fail-safe operation on a regular job priority basis while the computer system is operating to handle other jobs and without dedicating the entire computer system to the diagnostic function.

10 Claims, 10 Drawing Figures

INVENTOR.
ANATOLY I. KANDIEW
BY
[signature]
attorney

INVENTOR.

ANATOLY I KANDIEW

BY

Attorney

INVENTOR.
ANATOLY I KANDIEW
BY
[signature]
Attorney

PATENTED SEP 19 1972 3,692,989

SHEET 4 OF 4

INVENTOR.
ANATOLY I KANDIEW
BY
Attorney

COMPUTER DIAGNOSTIC WITH INHERENT FAIL-SAFETY

BACKGROUND OF THE INVENTION

In the field of computers, it is advantageous to connect central computers to remote input-output devices, such as remote input-output computers, in an effective shared time computer system having a large, fast-acting central scientific computing facility, referred to hereinafter as a CSCF. At the Brookhaven National Laboratory, for example, there are many groups that have their own relatively small computers that are located at widely spaced distances from their CSCF and it is advantageous to connect these remote computers as well as other remote input-output devices to the CSCF to expand the capability of the remote input-output devices.

Examples of such remote input-output devices at the Brookhaven National Laboratory comprise a Chemistry Department Computer, a Physics Department Computer, a 33 GeV Alternating Gradient Synchrotron Computer for experimental data processing and machine control, a Medical Department Computer, an Applied Mathematics Department Computer for the investigation of graphic displays of crystals, etc., a remote computer for communicating back FOCUS for forth with the CSCF for implementing a system called FOCUS for providing on-line file handling capabilities to the CSCF users via remote teletypes, and a wide variety of other remote input-output devices at locations up to a mile or more apart for monitoring experiments, controlling special equipment, storing and processing a wide variety of data, accumulating data from many widely spaced locations, and performing a wide variety of arithmetical and logical operations. In this regard, it is advantageous to selectively expand the capabilities of any remote input-output device by functional integration thereof with the computational power and speed of a CSCF, but heretofore this has required difficult, expensive, and time-consuming trouble-shooting and diagnostics, and/or has involved other problems, as will be understood in more detail hereinafter.

These above-mentioned problems in connecting and operating the remote input-output devices with the CSCF's known heretofore, will be understood by one skilled in the art in view of the complexity, size and speed of these CSCF's. Also, each CSCF has had its own particular features and characteristics that have had to be taken into account in achieving the desired functional integrity. Accordingly, a brief description will be provided of the CSCF at the Brookhaven National Laboratory for an understanding of their desired shared time computer system, which is referred to hereinafter as Brooknet.

The Brooknet CSCF, comprises two CDC 6600 central computers, which as is well known in the art are described in Control Data Publication No. 60119300, November 1964. Each CDC 6600 computer has at least 10 peripheral and control processors, referred to hereinafter as PP's, which will be particularly discussed hereinafter in more detail, a central processing unit, hereinafter referred to as a CPU, a central memory having an extended core storage, hereinafter referred to as an ECS, and peripheral equipment controllers, hereinafter referred to as peripheral, e.g., such as shown in FIGS. 1 and 2.

The PP's are particularly important in understanding the Brooknet system, since each PP is an independent computer with 4,096 words of core storage for electrical binary signals and has a repertoire of 64 instructions. In this regard, as will be understood in more detail from the following, the PP's share access to the central memory and to 12 bi-directional input-output channels for performing the important intermediary control function of controlling the communication between the mentioned CPU and the remote input-output devices.

In this regard, it will be understood that these heretofore known PP's are conventionally combined in a multiplexing arrangement that allows them to share common hardware for arithmetic, logical, I/O, and other operations without sacrificing speed or independence. As well known in the art, this multiplexing arrangement, comprises a barrel, slot and common paths to storage (not shown for ease of explanation), and I/O channels.

The barrel is a matrix of FF's (flip-flop circuits) used to hold the quantities in the operating registers of the PP's and to give each a turn to use the execution hardware in the slow adders, shift network, etc. The quantities in the barrel shift from slot output to slot input. Each time a processor's (i.e., a PP's) data enters the slot, a portion of the instruction is executed, as shown in drawings 60119300 of the above-mentioned CDC publication.

A trip around the barrel requires 1,000 nsec (one major cycle), of which each processor's (i.e., PP's) data spend 900 nsec. in the barrel and 100 nsec. in the slot. Each PP has its own independent 4,096 word memory that may be referenced once each major cycle (once each trip around the barrel).

The PP's read data from the above-mentioned remote input-output devices, perform preliminary arithmetic and logical operations, send data and programs to the central memory in the form of binary electrical, signals, assign tasks to the CPU, read the CPU results from the central memory, and send results to external storage, comprising conventional magnetic tapes, disc files, etc., or to the mentioned conventional remote input-output devices, or conventional line printers, display consoles, etc.

Characteristics of the PP's are:

— 4,096 word magnetic core storage (12-bits)
Random access, coincident current
Major cycle - 1,000 ns
Minor Cycle - 100 ns
— At least 12 bi-directional input-output channels
All channels available to all PP's
Maximum transfer rate per channel - one word/major cycle
— Real-time clock (period 4,096 major cycles)
— Instructions
Arithmetic
Logical
Input-Output (i.e. I/O)
Central memory read/write
Exchange jump
— Average instruction execution time — two major cycles
— Indirect addressing
— Indexed addressing Timing for the operations of the mentioned PP's which is conventional, comprises a four-phase master clock located on a PP chassis (1). Four 25 nsec. pulses issue each minor cycle to control movement of data and instructions. A storage sequence control system, timed by the four-phase clock, controls storage references and defines the PP's.

The master clock, comprises a TD module and a TI module. To form the 25 μsec clock pulses, a pulse from the TD is ANDed with a similar pulse that has been delayed and inverted by the TI. This results in a series of electrical pulses (primary clock) that fan out through TC modules for use as timing control. In addition to forming the clock pulses on the above-mentioned PP chassis, the master clock sends electrical pulses to another PP chassis (5) and from there to all the other PP chasis. On each chassis, the incoming electrical clock pulses form a clock system similar to the first above-mentioned PP chasis (1). Synchronization of all the clocks on all the chassis provides the same times 00 on all chassis.

The above-mentioned barrel (not shown for ease of explanation) contains A, P, Q and K registers for each of the PP's. The functions of these four registers in the barrel, comprise:

A (18 bits) — A holds one operand for add, shift, logical and selective operations. The 18-bit quantity in A may be an arithmetic operand, central memory address, or an I/O function or data word.

P (12 bits) — P is the program address register. (P) is also used as a data address in certain I/O and central instructions.

Q (12 bits) — Q holds the *d* portion of instructions or may hold a data word when *d* is an address.

K (nine bits) — K holds the F portion of an instruction word and the trip count (the number of times an instruction has been around the barrel).

The A register in the barrel receives the result of add, shift, logical or selective operations in the slot. This quantity may be stored, returned to the slot unaltered or used to condition other operations. A is conventionally tested to determine its sign and whether it is zero, non-zero or one. The result of these tests maybe used to condition jump or for other instructions. The quantity in A may be a full 18-bit central address or a 12-bit peripheral word (in which case the upper six bits will be zero).

The connections to A in the barrel are:

Outputs —

A → M - (A) may be sent as a data function word on one of the I/O channels.

A → Central Address Register - (A) is the central memory address in central read and write and exchange jump instructions.

A → Y - For a store instruction, (A) is sent to Y and then to storage.

A → Translation networks.

Inputs

X → A — The content of the central program address register is sent to the peripheral X register every minor cycle. A 27 instruction sends X to A and enables a PP to monitor the progress of the central program.

R → A — An input to A instruction gates a word from an I/O channel into A.

F*d* → A — A data word from storage is entered into A by the F*d* → A path.

A → A — When the quantity in A is to be returned to the slot unaltered, the A → A gate is enabled.

The P register holds the program address and is not changed in the barrel (except by Dead Start) which will accordingly be briefly described hereinafter). (P) is sent to a storage unit from a stage 6 in the barrel. This allows time to read a word from storage and make it available at slot time. (P) is sent to the G register, which feeds all storage and address or S registers. When a jump is called for, P is sent to Q from a barrel stage 12. Q is then altered by the Q-adder in the slot and the new address returns to P at the first stage of the barrel.

The Q-register holds the *d* portion of an instruction and has several outputs to translation networks that make channel selections for I/O instructions. When *d* is an address (Q) is sent from the slot to P in the barrel and the word obtained from that address is entered into Q in the slot. When a jump is called for, the quantity in Q is added to or subtracted from (P) in the Q-adder and the result sent to P. When an instruction calls for an 18-bit operand, the lower six bits of Q are sent to the upper six bits of A to form the 18-bit quantity *d*m.

The K-register holds the portion of an instruction word and a 3-bit trip count that sequences the execution of an instruction. K is translated at two different times during a trip around the barrel; first to determine if a storage reference is needed, and second, to provide the proper commands at the slot. During the barrel trip in which a new instruction is being read from storage, a translation of K = 00X enables translations from F*d* in the storage cycle path to be used in place of K translations. This eliminates the need for a separate "Read Next Instruction" trip through the barrel and allows certain instructions to be read from storage and executed all in one trip. The K = 00X translation arises from the fact that K clears at the end of each instruction.

Concerning the mentioned slot, a brief description thereof will additionally help understand the operation of the above-described PP's with particular reference to the mentioned particular features and characteristics of the CDC 6600 computers. In this regard, this slot, which is illustrated in drawings 60119300 of the above-mentioned CDC publication, contains the execution hardware for the mentioned registers A, P, Q and K for the PP's. Each processor is allowed one minor cycle in the slot during every major cycle. Included in the slot are:

A Adder Shift Network Logical Circuits Selective Circuits

P Incrementor Inputs from P or Q in the barrel

Q Adder Input Path from Fd

K 3-bit Trip Counter Input from F K = 340 Gate

As A, P, Q and K enter the slot, K translations (started earlier in the barrel) become available and a portion (or all) of an instruction is executed. The results are gated back into the barrel to be stored, used again, or sent to I/O equipment.

A brief description of the heretoforeknown storage sequence control, which relates to the operation of the PP's, is also pertinent to an understanding of the particular features and characteristics of the CDC 6600's which add to the immensity and complexity of the heretofore known problems in connecting the remote input-output devices to the Brooknet CSCF.

In this regard, timing of the memory references is controlled by the Storage Sequence Control, which is a timing chain of FF's gated by clock pulses. As a "1" passes down the chain, each FF is set for one minor cycle during which it issues commands to the storage logic. This chain reinitiates itself after each cycle and runs continuously. One memory reference is initiated each minor cycle.

The stages of the storage sequence control, a typical stage "*a*" being described below, are numbered according to the PP (processor) for which they initiate a memory reference, the references of a typical stage "*a*" being overlapped by the Storage Sequence Control. The commands issued by the first half of a typical stage are:

G S, Storage *a*
Clear Z, Storage $a + 1$
Set Z, Storage $a + 5$
Enable Sense, Storage $a + 7$
The second half of state "*a*" issues commands:
Read, *a*
Write, $a + 5$
Stop Read, $a + 6$
Stop Write, $a + 1$ These commands and other signals from the storage sequence control define and separate the PP's.

It will also be understood by one skilled in the art hereof, that the reset circuit that reinitiates the storage sequence control, senses whether stages 0 – 8 are set, and if not, stage 0 is reinstated just after stage nine has issued its commands.

In like regard, a memory reference is initiated from stage 6 in the barrel, so that information from memory is available at slot time. Thus, a memory reference for processor 0 (storage 0) is initiated while processor 5 is in the slot.

A short additional description of the above-mentioned PP memory will also aid in understanding the above-mentioned problems and complexity in connecting the Brooknet CSCF with any desired remote input-output device. In this regard, the PP's have in addition to their own core-storage units, as mentioned above, their own address register (S), sense amplifiers, and restoration register (Z). However, these storage units share a common memory cycle path and common paths to and from the barrel. Each PP makes one memory reference each major cycle. When no memory reference is called for by the current instruction, address 0000 is read and restored.

The above-mentioned PP common memory cycle path warrants a further comment, as will be understood in more detail hereinafter. These common memory cycle paths receive data from the memories via the sense merge, as will be understood by one skilled in the art. To this end, the inputs to the sense merge from the sense amplifiers, are a logical "1" (0.2v) when sense is not enabled. When a PP's (processor's s sense amplifier is enabled, the outputs of the PS modules are allowed to go from +1.2v for a sensed "0." 1." Tf the core switches, the sense amplifier output goes to "0.2v "1". The AND combination of logical "1's" from unselected PP's (processors), even or odd sense, enable, and "1" bits from the selected PP's (processors), sense amplifiers, sets the word from memory into the F*d* register in the memory cycle path.

Also, with regard to the memory cycle path, this path sends information to the barrel, I/O channels, translators and central write pyramid which will be briefly discussed hereinafter, and receives information from the barrel, central read pyramid, and I/O channels. Outputs from F*d* in the memory cycle path are translated and used to form commands when $K = 00X$ (read next instruction trip).

In this regard also, the memory cycle path (either the read word or a new word) is fanned out from the Y-register to the Z-registers. The set signal from the storage sequence control, gates the complement of the word to be stored into the proper Z-register.

Since the K-register, A-adder and shift network are important in understanding the above, a few short comments thereon will be added. In this regard, an example of K in the above-mentioned slot, comprises a three-bit counter for the lower three bits and a fan-in for the upper six bits. The advance K-signal to the trip counter is enabled by instruction translations. In some instructions, the advance K signal is controlled by signals that indicate status, e.g., the $5 \times 0$ trip may be skipped by all 5x instructions if $d = 0$, and when $K = 732$, $K$ may be advanced only if the I/O channel is empty and active and $A = 1$.

Likewise with regard to the K register, the three-bit trip controls the sequence of operations for each instruction and is sometimes changed by gates other than the trip counter. For example, for a central write instruction (63), K is changed from 637 to 633 to repeat the sequence of commands and to send another word. When a 63 instruction is completed, K is changed from 637 to 733 to finalize the instruction and obtain the next instruction from storage.

Finally, with regard to the K-register, the fan-in to the upper six bits of K allows the instruction code F to be entered into K from storage. The K → K path allows another trip around the barrel for the present instruction. The path $K = 340$ is used to replace instructions that automatically use the store instruction 34 to accomplish the store portion of the replace instructions.

Now the A-ADDER will be briefly discussed in the above-mentioned context for understanding the operation of the PP's and the consequent problems of connecting and operating the Brooknet CSCF with any desired remote input-output device. In this regard, as will be understood by one skilled in the art, the A-ADDER is used to execute add, subtract, selective clear, logical product, and logical difference instructions, as illustrated in drawings 60119300 of the above-mentioned CDC publication. Parts of the A-adder are also used to enter a word into the shift network and gate the result back to the barrel. The quantity in A in the barrel is complemented when it enters the slot. When no operation on A is called for, (A) is complemented, enters the A-adder, is added to zero, and the result is recomplemented at the output. The Add gate in the QD modules is enabled except when Selective Clear, Logical Product, or Shift commands are enabled.

The following table will make this clear to one skilled in the art with regard to this A ADDER:

TABLE I

Add

For an add instruction (A) is complemented and entered into the A-input register. The second operand is also complemented and entered into the B-input register. The two quantities in the input registers, taken as positive are added and the sum is recomplemented as it is gated out of the QD modules to the barrel.

Subtract

For substract instructions, the minuend, (A) is complemented as it enters the adder. The subtrahend is entered into B without being complemented and the two quantities are added as in an add instruction.

Selective Clear

For selective clear, the complement of A and the true value of *d* are entered into the adder and both the selective and the logical product gates are enabled.

Logical Product

For logical product instructions, both A and *d* (or *dm*) are complemented before entering the adder and both the logical product and the selective gates are enabled.

Logical Difference

For logical difference instructions, the complement of A and the true value of the second operand enter the adder and only the selective gate is enabled.

Referring in like regard to the Shift Network for an understanding of the operation of the PP's by one skilled in the art, the shift instruction (10) provides for shifting the number in A up to 31 places left or right. Left shift is circular with the high order bits re-entering A at the low order end. Right shift is end-off with low order bits discarded as they shift out of the A-register and with no sign extension. Thus, a left shift of 18 is equivalent to no shift, and a right shift of 18 clears the A-register.

It will be understood that the Shift Network is static. In this regard, the content of A enters the register at time IV, each bit follows a path established by static translations of the six-bit shift count in *d*, and the result enters A in the barrel at the next time IV. The input to the Shift Network from the A-input register in the A-adder (the content of that register, which is the complement of A), is recomplemented before entering the shift register. The output of the Shift Network is gated back to the barrel by way of the output modules (QD) of the A-adder. It will be noted also, that the quantity in A is shifted but the result is gated to the barrel only when the current instruction is a shift.

Likewise, with regard to the shift Network, if *d* is positive ($00–37_8$) the shift is left and the shift count is the content of *d*. If *d* is negative ($40–77_8$) the shift is right and the shift count is the complement of the number in *d*.

Likewise, with regard to the Shift Network, at the first stage of the Shift Network, $d_4$ and $d_5$ are tested to determine whether the shift is greater or less than 16 and whether it is left or right. If the shift is 16 or greater, a shift of 16 is made at this point and the result then enters the rest of the Shift Network. It is also noted that bits $d_o - d_3$ are tested with $d_5$ to set up paths through the rest of the network.

Finally, in understanding the complexity of the heretofore known problems in connecting the remote input-output devices to the Brooknet CSCF, reference is made to the fact that the PP's communicate in several ways with central memory and the CPU. In this regard, the PP's may read the CPU's program address, tell the CPU to jump to a given central memory address for its next instruction, or read from or write into central memory, as is well known in the art.

To this end, the Central Program Monitor bears mentioning, since the 18-bit CPU program address is sent to the Central Program Monitor register on chassis 1 every minor cycle. In this regard also, a Read Program Address instruction (27) sends the central address to the A register. Thus, the progress of a central program may be monitored by any PP acting as a peripheral and control processor.

Also, with regard to this Central Program Monitor, Exchange Jump, Central Read, and Central Write instructions all use the content of A as a central memory address. (A) is unconditionally sent to address control in the CPU every minor cycle. This quantity is recognized and used as a central memory address only if accompanied by a Central Read, Central Write, or Exchange Jump signal. It is additionally noted that the Central Busy FF indicates when a reference to central is in progress. Also, a central busy condition prevents initiating a central reference until one in progress is completed.

Now, with regard to the Exchange Jump, an exchange jump instruction is used to command the CPU to stop the program it is executing and go to a central memory location specified by the instruction. An exchange jump may be issued by any PP so long as the Central Busy FF is clear. The instruction sends an Exchange Jump signal to the CPU and sets the Central Busy FF. The Exchange Jump signal tells the CPU to recognize the 18-bit address sent from the PP and to perform an exchange jump. After the CPU has performed the exchange jump and started a new program, it sends a Resume signal that clears the Central Busy FF to allow another central reference. If a PP tries to issue an Exchange Jump instruction while the Central Busy FF is set, the PP must wait until the previous central reference is completed and the Central Busy FF is cleared.

Now, regarding the above, with particular reference to Central Read, the Central Read instruction allows a PP to obtain one word (60 bits) or a block of words from Central Memory. The instruction sends a Central Read signal to central address control enabling it to use the 18-bit quantity from A as a central memory address. At the same time, the Central Busy FF is set to inhibit other references to central until the read word is received.

As will be understood in more detail hereinafter, when a 60-bit word has heretofore been conventionally sent by central to the Central Read Pyramid (shown in FIG. 2), it has been accompanied by two control signals, an accept that clears the Central Busy FF, and a signal that sets the $C^5$ Full FF. Each rank of the mentioned Central Read Pyramid $C^1$ – $C_5$ has had an associated Full/Empty FF used to control the flow of data through the pyramid. $C^5$ full and $C^4$ Empty has enabled the PP doing the read instruction to send the upper 12 bits of $C^5$ to memory and the lower 48 bits to $C^4$, as will be understood in the art. Subsequent steps in the central Read instruction has resulted in stepping the central word down through the pyramid and storing the rest of the central word as 12-bit peripheral words. Each step in this storage procedure has required that the next lower rank in the heretofore known pyramid be empty before a transfer was made. No Central Read instruction conventionally has been issued until $C^5$ Full FF and Central Busy FF have been clear. However, as many as five central memory words, in different stages or disassembly, have been in the Central Read Pyramid at one time. A read instruction for which the proper full and empty conditions have not been met has required waiting until previous instructions have progressed further and conditions have been met. In regard also to Central Read, as will be understood by one skilled in the art, it is noted that a 60 instruction heretofore read only one central memory word and stored it as five peripheral words. Likewise, a 61 instruction read a block of words specified by (*d*). In either instruction the first central memory address has been specified by (A). For a 60 instruction, *d* has specified the peripheral address at which the upper 12 bits of the peripheral word have been stored; the next lower 12 bits going to *d* + 1, etc. For a 61 instruction, (*d*) has given the number of central words to be read and *m* has been the address for the upper 12 bits of the first central word.

Central write instructions, which also will be understood as being related to the above, send one 60-bit word or a block of 60-bit words to Central Memory. In this regard, each 60-bit word that has been conventionally sent to Central Memory has been assembled in the central Write Pyramid known heretofore from five 12-bit peripheral words. A Central Write instruction has assembled a 60-bit word and sent the word and a Central Write signal to central address control and of disassembly, the Central Busy FF. The Central Write signal has enabled central address control to accept the 60-bit word and to store it at the address specified by (A). When the word has been stored, an accept signal has been sent back to clear the Central Busy FF. Up to four Central Write instructions could heretofore have been in progress at one time with portions of four different words in $D^1$– $D^4$. $D^5$ has been an output network only and could not store a word. The first 12-bit word has gone to $D^1$ and has been the upper 12 bits of the 60-bit word. When a second 12-bit word has gone to $D^2$, $D^1$ has also sent to $D^2$. When the fifth word has gone to $D^5$, the 48 bits in $D^4$ have also been sent to $D^5$ and the 60-bit word has been sent to central.

The operation of the Input/Output is as follows. Each of the independent data channels 0–14 (see FIG. 2), can handle 12-bit words at a maximum rate of one word every major cycle, which is equivalent to a 1 megacycle rate. Each channel has an Active/Inactive FF and a Full/Empty FF which indicate channel status to the PP's. Any channel may be used by any PP, but the external equipment to a channel, as is conventional, is wired in and may be assigned to another channel only by changing cable connections.

The conventional lines of a data channel are listed in the following table II:

TABLE II

| INPUT | OUTPUT |
|---|---|
| Data or Status Reply (12 bits) | Data or Function Word (12 bits) |
| Active | Active |
| Inactive (Disconnect) | Inactive |
| Full | Full |
| Empty | Empty |
| | MC |

In addition, as illustrated in Drawings 60119300 of the above-referenced CDC publication, two clock signals are available to the external equipment: a 1 mc/sec clock and a 10 mc clock. The clock pulses are 25 nsec wide, as are all data and control signals (except master clear). Controllers for each piece of external equipment (or group thereof) perform the conversion between the 6600 pulse signals and the signals required by the I/O devices.

A data channel may be used for communication between PP's if the channel is selected for input by one PP and for output by another PP. The status of the data channels may be sensed by instructions 64–67: jump to *m* if channel *d* active, etc.

Master Clear (i.e., MC) can next be more particularly described. In this regard, an MC signal is generated only by a Dead Start Circuit so as to remove all equipment selections except Dead Start and to set all channels to the Active and Empty Condition (i.e., read for input). MC is a 1$\mu$sec pulse that is repeated every 255$\mu$sec. while the Dead Start switch is on.

The importance of Disconnect (75), can be described as follows. A disconnect instruction clears the channel Active FF if the latter is set and sends an inactive pulse to the equipment on that channel. Given a disconnect instruction for an already inactive channel, the processor that issued the disconnect will cause the important problem of a "hang up," which means that the PP will not be able to continue until the channel is re-acticated. The importance of this "hang up" will be discussed in more detail hereinafter, and also will be understood hereinafter in connection with the below described invention.

Function (76 or 77) can be described as follows. A function instruction sends a 12-bit function code (from A or F*d*) on the data lines and sends a Function signal. This function instruction also sets the Active and Full FF's for the channel but does not send Active and Full pulses. Upon receipt of the function code, the external equipment sends an Inactive (disconnect signal, clearing the Active FF in the data channel, which in turn clears the Full FF. If a function instruction is given for an active channel, the PP will "hang-up" until the channel is de-activated. As will be understood by one skilled in the art, it is advantageous to avoid such "-hang-ups" in a fail-safe manner in connecting and operating the remote input-output devices of Brooknet with the CSCF. In this regard, important advantages of avoiding such "hang-ups" will be understood in more detail hereinafter.

With regard to Activate (74), an Activate instruction sends an Active signal on the channel and sets the Active FF if the channel is inactive. If an Activate instruction is given for a channel that is already active, the PP that issued the instruction will "hang-up" until the channel is inactivated, e.g., by another PP or by an Inactive (disconnect) signal from external equipment on the channel. The importance of this "hang-up," like the other above-mentioned "hang-ups" will be understood by one skilled in the art, since these "hang-ups" have presented highly complex if not insurmountable problems in connecting some of the above-mentioned remote input-output devices to the Brooknet CSCF.

Regarding the above in relation to one example of the Data Input Sequence, an external device sends data to the processor (PP) by way of the controller according to the steps illustrated by the following Table III:

TABLE III

1. The processor places a function word in the channel register and sets the full flag and the channel active flag. Coincidentally, the processor sends the word and a function signal to all controllers. The function signal tells the controllers to sample the word as a function code rather than a data word. The code selects a controller and a mode of operation. Non-selected controllers clear, leaving only the selected one turned on.

2. The controller sends an inactive signal to the processor indicating acceptance of the function code. The signal drops the channel active flag, which in turn drops the full flag and clears the channel register.

3. The processor sets the channel active flag and sends an active signal to the controller, which signals the device to start sending data.

4. The device reads a word and then sends the word to the channel register with a full signal, which sets the channel full flag.

5. The processor stores the word, drops the full flag, and returns an empty signal indicating acceptance of the word. The device clears its data register and prepares to send the next word.

6. Steps 4 and 5 repeat for each word transferred.

7. At the end of the transfer, the controller clears its active condition and sends an inactive signal to the processor to indicate the end of the data. The signal clears the channel active flag to disconnect the controller and the processor from the channel.

8. As an alternative, the processor may choose to disconnect from the channel before the device has sent all of its data. The processor does this by dropping the active flag and sending an inactive flag to the controller, which immediately clears its active condition and sends no more data, although the device may continue to the end of its data record or cycle (e.g., a magnetic tape unit would continue to the end of the record and stop in the record gap).

One example of the Status Request, which is also relevant to the above-mentioned problems, comprises a special one word data input transfer in which an external remote input-output device indicates a ready or error condition to a processor (PP, according to the steps illustrated by the following Table IV:

TABLE IV

1. The processor places a function word in the channel register and sets the full flag and the channel active flag. Coincidently, the processor sends the word and function signal to all controllers. The function signal tells all the controllers to sample the word and defines the word as a function code rather than a data word. The code selects a controller and places the controller in status mode. Non-selected controllers clear, leaving only the selected one turned on.

2. The controller sends an inactive signal to the processor indicating acceptance of the status function code. The signal drops the channel active flag, which in turn drops the full flag and clears the channel register.

3. The processor sets the channel active flag and sends an active signal to the controller, which signals the device to send the status word.

4. The controller sends the status word to the channel register with a full signal that sets the channel full flag.

5. The processor stores the word, drops the full flag, and returns to an empty signal indicating acceptance of the word.

6. The processor drops the channel active flag to disconnect the channel and sends an inactive signal to the controller to disconnect the controller.

In examples of the Data Output Sequence, the processor sends data to an external device according to steps illustrated by the following:

1. The processor places a function word in the channel register and sets the full flag and the channel active flag. Coincidently, the processor sends the word and a function signal to all devices. The function signal tells all the controllers to sample the word and identifies the word as a function code rather than a data word. The code selects a controller and a mode of operation. Non-selected controllers clear, leaving only the selected one turned on.

2. The controller sends an inactive signal to the processor, indicating acceptance of the function code. The signal drops the channel active flag, which in turn drops the full flag and clears the channel register.

3. the processor sets the channel active flag and sends an active signal to the controller, which signals the device that data flow is starting.

4. The processor places a data word in the channel register and sets the full flag. Coincidently, the processor sends the word and a full signal to the controller.

5. The controller accepts the word and sends an empty signal to the processor, where the signal clears the channel register and drops the full flag.

6. After the last word is transferred and acknowledged by the controller with an empty signal, the processor drops the channel active signal to the controller to turn it off.

A brief description of Dead Start, Load, Sweep and Dump relate to an understanding of the heretofore known operation of the above-mentioned elements, with particular reference to the initial operation of the PP's.

Dead Start is a system used initially to start the Brooknet CSCF computers to dump the contents of the PP memories to a conventional printer or other conventional output device, or to sweep the mentioned memories without executing instructions. The Dead Start panel, comprises a 12 × 12 matrix of toggle switches, a Sweep-Load-Dump switch, a Dead Start switch, and memory margin switches that are used for maintenance checks.

Initially, to load the programs and the data, the Sweep-Load-Dump switch is put into the Load position. The matrix of toggle switches is set to a 12-word program (up="1," down="0") In one example, when the Dead-Start switch is turned on, a 1μsec Dead Start pulse performs the following Table V, which will also be understood from drawings 60119300 of the above-mentioned CDC publication:

TABLE V

1. Assigns to each PP the corresponding I/O channel.
2. Sets all channels to Active and Empty.
3. Sets K for all processors (PP's) to 712 (Input).
4. Sends an MC on all channels.
5. Sets A and P for all processors to zero (A being then set to $10000_8$ at stage 10 in the barrel).

The Dead Start pulse is repeated every 225μsec while the Dead Start switch is on. To start the machine, the DS switch is normally turned on momentarily, and then is turned off. Recycling of the DS pulse is controlled by the Real Time Clock; the pulse is formed by ANDing the DS switch in the ON position with 10 bits of the Real Time Clock.

When the Dead Start controller on channel 0 receives the MC sent by Dead Start, this controller sends a Full pulse but no data. When processor 0 receives the Full, the processor stores the content of the channel 0 input register (all zeros) in location 0000 and sends an Empty pulse to the Dead Start controller. The Dead Start controller then acts as an input device, sending 12, 12-bit words from the switch matrix, these words being stored in locations 0001 – $00014_8$. After the last word, the Dead Start controller sends a disconnect that causes processor 0 (i.e., PP–O) to exit from the 712 instruction. PP-O reads location 0000, adds one to its contents and goes to 0001 for the next instruction. This PP-O then executes the 12-word (or less) program, which normally is a control program to load information and begin operation. The other PP's are still set to 712 (waiting to input when their channels become full) and may receive data from PP-O via their assigned I/O channels.

Regarding the above-mentioned Sweep, if the DS switch is operated with the Sweep-Load-Dump switch in the Sweep position, all PP's are set to a 505 instruction and P registers set to 0000. Since the 50 instruction does not require five trips around the barrel, there is no logic to clear or advance K from 505. The 50x translation of K causes all PP's to sweep through their memories, reading and restoring without executing instructions. This is a maintenance routine and may be used to check the operation of the memory logic.

In one example of the above-mentioned Dump, the Dead Start with the Sweep-Load-Dump switch in the Dump position causes the following steps illustrated by the following Table VI:

TABLE VI

1. Sets all PP's to 732
2. Sends MC on all channels.
3. Holds channel O Active and Empty.
4. Assigns each PP to its corresponding I/O Channel.
5. Sets all A an P registers to O.

In regard to the above mentioned steps of Dump, all PP's sense the Empty and Active condition on their assigned channels, output the content of their address 0000, set their I/O channels to Full, and wait for an Empty. All PP's advance P by one and reduce A by one ($A = 7776_8$). Channel 0, which is assigned to PP – O, is held Empty by the Dump Switch. PP–O, thereupon cycles through the 732 instruction until A = 1 and then goes to memory location 0001 for its next instruction. PP–O has sent its entire memory content on channel 0 although no I/O device was selected to receive this memory content. PP–O is now free to execute a dump program, which must have been previously stored in memory 0, beginning at location 0001.

Other elements of the Brooknet CSCF CDC 6600 computers, which are also discussed in detail in the above-mentioned CDC publication, comprise the Console Display Controller, Disk System Controller, Card Reader Controller, Magnetic Tape Transport Controller, Printer Controller, and Card Punch Controller. In this regard, the operation of each of the described CDC 6600's is performed by well known hardware and non-mental software, as will be understood from the above described description by one skilled in the art. In this regard, it will be understood that one conventional software system for these CDC 6600's is the SCOPE 3.1 system described in detail in the SCOPE 3 Manual, which is published by the Control Data Corporation as Reference Manual Publication No. 60189400, dated Apr. 1, 1968. To this end, it will be understood that these conventional programs and other non-mental programs can be stored in the PP memories and the Central Memory of the CPU. Also to this end, all PP's may use this Central Memory for Supplementary storage or inter-communication control. Thus, for example, the Central Memory addresses are generated by the CPU and all PP's, as illustrated in the 60119300 drawings of the above-mentioned CDC publication.

As described in that publication, the Central Memory involves the conventional operations and elements, comprising: Address-Data Flow; Go Control, Address Flow; Storage Sequence Control; Data Flow, write Control; Data Distributor; Read Distributor, Write Distributor.

From the above, it will be understood that immense and complex problems have heretofore been involved in connecting the mentioned remote input-output devices to the described Brooknet CSCF even though conventional devices and steps have been involved. In this regard the functional integrity of each an every one of the remote input-output devices, the proper scheduling of their operations on a regular priority basis, and/or the physical operation with the described CPU via the described data channels and PP's, has heretofore involved the full testing of the functional integrity of these remote input-output devices by the execution of the PP instructions that effect each remote input-output device. Thus, for example, the behavior of these instructions could be compared with their expected behavior to determined if the remote device was functioning properly. However, this has involved writing logical programs made up of PP instructions in order to test the functional integrity of each of the remote devices, and ordinarily the writing of these programs has been very time consuming, difficult, and expensive. Moreover, there has been no assurance that these logical programs and/or the instructions were protected. In this regard, protected means:

1. The PP instructions in the program in a particular PP, i.e., the particular non-mental PP software program, will not suspend the operation of that PP even if the remote device being tested malfunctions, i.e., the hardware (or the non-mental software of the remote device if it is a computer) malfunctions;

2. The instructions in the above-referred to PP program will not destroy any other part of that program or any part of the PP resident programs in any other PP due to logical program errors.

It will be understood, therefore, that the heretofore known diagnostics have been expensive, difficult, and time-consuming, have lacked fail-safety, and have also frequently required the dedication of the CSCF to the diagnostic tasks, which has resulted in the still further expense of shutting down the entire CSCF and the loss of the valuable production time thereof.

It is an object of this invention, therefore, to provide a diagnostic that does not devote the entire CSCF to the diagnostic;

It is another object to provide a non-mental diagnostic process that is carried out exclusively by the CSCF;

It is another object to provide continuously self-diagnosing computer hardware for preventing failures, and for diagnosing, recording and/or correcting failures in the CSCF and in the remote input-output devices for continuously maintaining communications back and forth between such devices and the CSCF;

It is a further object to improve the Brooknet computer system by providing a diagnostic that functions as a standard job while the Brooknet system is operating to perform many other standard jobs;

It is a still further object to provide a fail-safe, non-mental, diagnostic, software package, referred to hereinafter as Quest, having its own language for maintaining the operation of the CSCF in the Brooknet computer system so that new or experimental input-output or other such remote devices can be added to the Brooknet system in a relatively trouble-free and expeditious manner without dedicating the entire CSCF to the diagnoses of the failures thereof.

In this regard, some of the objectives of QUEST are to provide:

a. A hardware orientated diagnostic language of high enough level to allow the user ease in writing, debugging and testing his (diagnostic) -user's program;

b. A generated code that is free from logical program errors;

c. A generated code that will not cause the executing PP to suspend its operation due to peripheral hardware malfunctions;

d. Means for responding to operator intervention;

e. A software package written substantially in an assembly language for a particular computer, e.g., the CDC 6600, which is described in "Control Data Corporation Customer Engineering" Control Data Publication Number 60119300, November, 1964;

f. A software package, comprising several subprograms, the principal ones of which are:

Phase I - Compilation i. TEST — which is written in a sufficiently high language for calling the proper subprograms into the process, and listing the user's program on the output file;

ii. COMPI — for actually translating and communicating the user's program from the special QUEST language into the PP instruction in a particular PP, noting any logical program errors, and taking the proper action;

iii. ERROR — which,upon encountering an error, is called for by COMPI to list the error in the appropriate place in the user's output file;

Phase II - Actual Running of Diagnostic iv. PPMTR — which monitors the execution or running of the diagnostic (user's program), receives the product of Phase I, and later passes the diagnostic on to another subprogram, referred to hereinafter as AYN, and (the product of Phase I being a block of code that represents the user's program translated into PP instructions) directs all recovery procedures in the event of hardware malfunctions;

v. AYN — which, unlike the previously mentioned subprogram (iv), resides in the PP along with the translated user's program (diagnostic), communicates the status of the (diagnostic) user's program to PPMTR, and records all errors and responds to operator intervention during execution of the (diagnostic) user's program;

vi. AIK — which, if communication between AYN and PPMTR is severed, represents a PP program that is called by PPMTR, which determines why the execution of the (diagnostic) user's program is suspended, and which attempts to correct the malfunction as directed by PPMTR.

In regard to the latter, it is an object of the interaction of the Phase II subprograms to insure that the operating system of the CSCF is undisturbed, regardless of the behavior of the hardware of the CSCF or the remote devices connected thereto, during the execution of the (diagnostic) user's program, thus preventing dedication of the CSCF solely to the (diagnostic) user's program, and providing for no loss of valuable CSCF production time.

Furthermore, it is an object of QUEST to:

1. detect malfunctions and to allow the execution of instructions to continue;
2. run as a subsystem of the CDC SCOPE 3 operating system, and be dependent upon the various system functions that SCOPE provides; and
3. specifically to test hardware attached to the CDC 6600 computer and which conforms to the particular I/O structure of that computer.

SUMMARY OF THE INVENTION

This invention which was made in the course of, or under a contract with the U.S. Atomic Energy Commission, provides a computer diagnostic that does not require dedication of the entire computer. More particularly, the computer diagnostic of this invention keeps in operation a time-sharing CSCF and many remote devices connected thereto, such as a plurality of computers, while diagnosing and/or preventing failures in the hardware and/or non-mental software internally and externally of the CSCF, and without dedicating the entire CSCF to the diagnostic. In one embodiment, the diagnostic hardware of this invention comprises a portion of the CPU, and two PP's that communicate with each other, the CPU, and the remote devices connected to the CSCF in a self-diagnosing system for maintaining the operation of the Brooknet system without dedicating the entire CSCF to the diagnostic. In another aspect, this invention provides a fail-safe diagnostic for the Brooknet system. With the proper selection of components and steps, as described in more detail hereinafter, the desired diagnostic is achieved. To this end, this invention contemplates in a computer system, comprising a plurality of data channels selectively coupled to a plurality of peripheral processors that are selectively coupled to a central processor, the method of analyzing the functional integrity of a device coupled to one of said data channels, comprising the steps of:

a. providing to the central processor a first stored program that monitors the state of a first one of said peripheral processors coupled to the said one of said data channels, and activates a second stored program in the said first one of said peripheral processors, said second stored program providing checks on the validity of the commands to and the validity of the responses from the said device, and
b. when the said first one of said peripheral processors becomes inoperative in response to an invalid response from the said device, then couples a second of said peripheral processors to the said channel and activates a third stored program in said second one of said peripheral processors, for restoring the functional ability of the said first one of said peripheral processors, and provides sequential time-based output information relating to the state of the said device, whereby, the said computer system retains its normal functional integrity independent of the functional integrity of the said device.

In another aspect, this invention involves the operation of the diagnostics on a regular job priority basis with other jobs in the CSCF.

The above and further novel features and objects of this invention will become apparent from the following detailed description of one embodiment of this invention when the same is read in connection with the accompanying drawings, and the novel features will be particularly pointed out in the appended claims.

BRIEF DESCRIPTION OF THE DRAWINGS

In the drawings, where like elements are referenced alike.

DETAILED DESCRIPTION OF ONE EMBODIMENT

This invention provides a fail-safe diagnostic for the Brooknet shared-time computer system described above for the operation thereof without dedicating the entire CSCF to the diagnostic. As such, this invention provides a diagnostic for a shared time computer system for binary signals, comprising a large CSCF having two CDC 6600 computers, which form a CPU and ECS as described in detail in Control Data Publication Number 60119300, November 1964, and which connects PPs across data channels to a large number of remote Brooknet computers and other remote binary input-output devices. Thus, the principles of this invention are applicable to many computer systems, computer types and shared-time computer applications where a fail-safe diagnostic is desired without dedicating the entire computer to the diagnostic. Also, while one application and one embodiment of this invention are described herein in connection with Brooknet, as will be understood in more detail hereinafter, this invention is useful in many Brooknet or other applications where diagnostic hardware and non-mental software are required for a time-sharing computer system.

Figure 1:
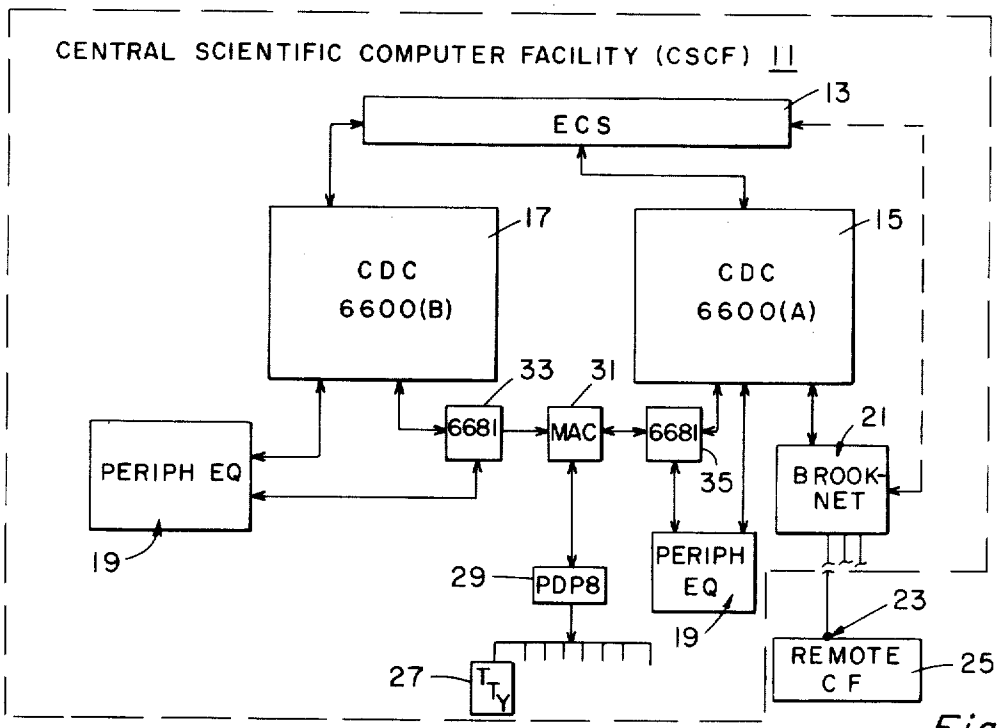
FIG. 1 is a partial schematic illustration of one embodiment of the apparatus of this invention.

Referring now to FIG. 1, CSCF 11, comprises an extended core storage 13, referred to hereinafter as ECS 13, a first, large, digital, binary signal computer 15, comprising (in line with the above description) CDC 6600 A, a second like large computer 17, comprising a second CDC 6600 B, and peripheral equipment 19 for the CSCF for the Brooknet shared computer system 21, which has at least one remote binary signal generating input and/or output device forming an input-output station 23 for communicating incoming and outgoing binary signals between station 23 and the CSCF 11. Advantageously, this remote station 23 is part of a remote digital, binary signal computer 25 that communicates back and forth with CSCF 11. To this end, various input and/or output signals are generated in both CSCF 11 and remote computer 25 as a result of various scientific, test, experimental or other inputs or outputs, and/or the operation of various computers or other hardware and nonmental software. For ease of explanation, this invention will be described in connection with only one binary CSCF 11 and only one remote binary computer 25, but it is understood that one or many such remote computers, or other standard binary input and/or output units having a wide variety of auxilliary or peripheral equipment may be used. Thus, for example, teletype 27 and/or other means not shown, having standard binary input and output means outside CSCF 11, communicate with CSCF 11 through a computer 29, such as a PDP–8 computer, which is connected to computers 15 and 17 through switch 31 and couplers 33 and 35.

It is likewise understood, that the remote input-output computer 25 is advantageously used for a wide variety of inputs and outputs requiring real-time or other communications between two points outside CSCF 11. Thus, this invention is useful in connection with a wide variety of remote means outside CSCF 11 e.g., for scientific experimental, research,manufacturing, educational, domestic, agricultural or other applications. One system for transmitting and communicating complicated real-time experimental information between a digital computer 25 and another means outside CSCF 11 for generating and/or receiving digital and/or analogue signals, is described in copending application Ser. No. 764,144, filed Oct. 1, 1968, now U.S. Pat. No. 3,582,901, by Cochrane and Russell, which is assigned to the assignee of this application and incorporated by reference herein. In this regard, on-line utilization of remote input-output digital computers, such as computer 25, is a relatively new phenomenon whose major impact has been in greatly improved quality of experimental data, and increased scope of nuclear experimentations. However, heretofore, large amounts of time have been necessary for programming, software and troubleshooting for each experiment. In this regard, it is enormously important to have programming systems that permit the writing of experimental programs with minimum expenditures of effort and of time, and with minimum requirements of computer expertise and troubleshooting diagnostics,e.g. of some isolated preamplifier or small malfunctioning unit, as described in YALE 3223-139, 145, 121, 130 and 129, which is also printed in Physics Today, July 1968.

The above will be understood by one skilled in the art, since the CSCF 11 and the remote input-output computer 25, involve well known communications, job priority systems, circuits and methods for generating, receiving, communicating and operating on digital information in the form of binary non-mental bits and bit streams. These bits are the smallest conceptualized units of information in binary form, and like numbers and letters are pure abstractions. However, to transmit these informational bits they must be represented in some physical form, such as electrical signals or pulses (1) or the absence of such electrical signals or pulses (0). Also, the CSCF 11 and remote computer 25 operate on or with these bits, e.g., to fetch and store the bits, and to execute various arithmetic and logical operations in connection therewith. The CSCF also operates on a regular job priority basis and it is advantageous to operate the remote computer 25 with the CSCF 11 on a regular shared time priority basis.

Figure 2:
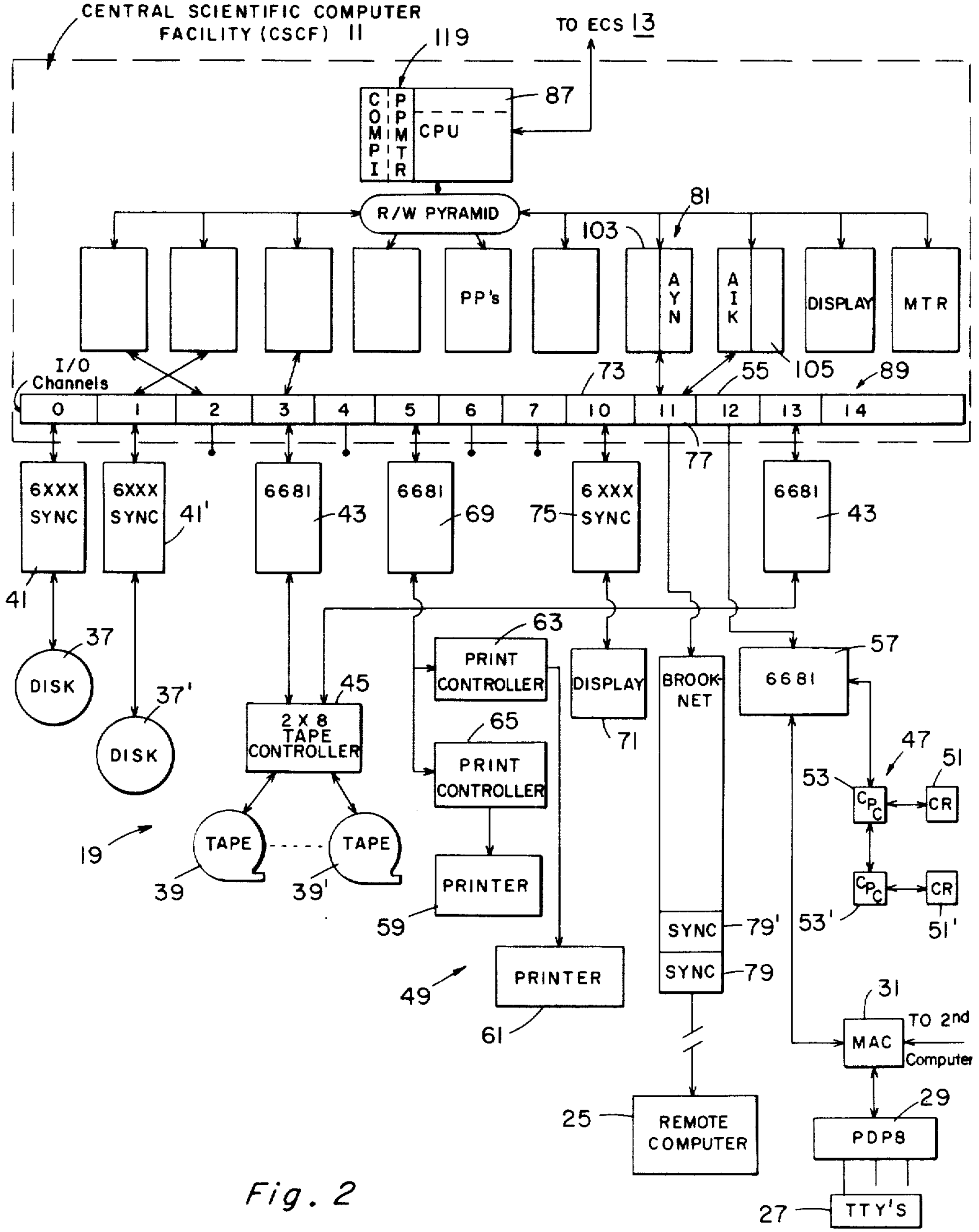
FIG. 2 is a partial schematic illustration of one arrangement of the computers of FIG. 1.

To this end, the CSCF 11 has a large number of elements governing the orderly flow of bits and words made of bits therethrough and back and forth with and through remote computer 25. For example, the peripheral equipment 19 advantageously comprises conventional large storage capacity but relatively slow operating discs 37 (compared to the CPU 87) and linear access tapes 39, synchronizers 41, couplers 43, controllers 45, and input and output means 47 and 49, as shown in FIG. 2. In this regard, non-mental bits corresponding to specific binary words and binary non-mental software programs are put into CSCF 11 from card readers 51 having standard card punchers 53 connected to a data channel 55 through a coupler 57. For read out purposes output 47, comprises standard printers 59 and 61 and standard print controllers 63 and 65, which are connected to a data channel 67 through coupler 69. Also, a suitable cathode ray tube oscilloscope display 71 connects with channel 73 through synchronizer 75.

It will be understood from the above that failures in communications to and from CSCF 11 and remote computer 25 may occur due to many possible human errors or unforeseen problems, such as hardware or non-mental software errors or failures and/or other errors outside CSCF 11, e.g., in teletypes such as TTY 27, PDP–8 computer 25, inputs 47, or outputs 49, e.g., due to errors on disks 37 and 37'. Moreover, these failures are hard to predict due to the complicated nature of the many input and output connections and communications between CSCF 11 and remote computer 25, which e.g., connects to CSCF 11 through a channel 77 and synchronizer 79 for the desired operation in the described Brooknet system 21. An additional complication is that fact that each PP 81, which is a computer having the usual hardware for standard and non-standard software, comprising non-mental programs, is as powerful as any other PP 81, and has access to each and every other portion of the Brooknet system, comprising any portion of the remote input-output computer 25, and CSCF 11, comprising (central processing unit) CPU 87 in computers 15 and 17, which has access to ECS 13, and data channels 89, comprising the above-mentioned channels 55, 67, 73, and 77. In this regard, the bits, bit streams and binary data words coming into and out of the various above-mentioned elements due to the connection of the remote computer 25 with CSCF 11 in the Brooknet system 21, can cause the PP's 81 to "hang-up," in which case the whole CSCF 11 was heretofore down for debugging.

Figure 3:
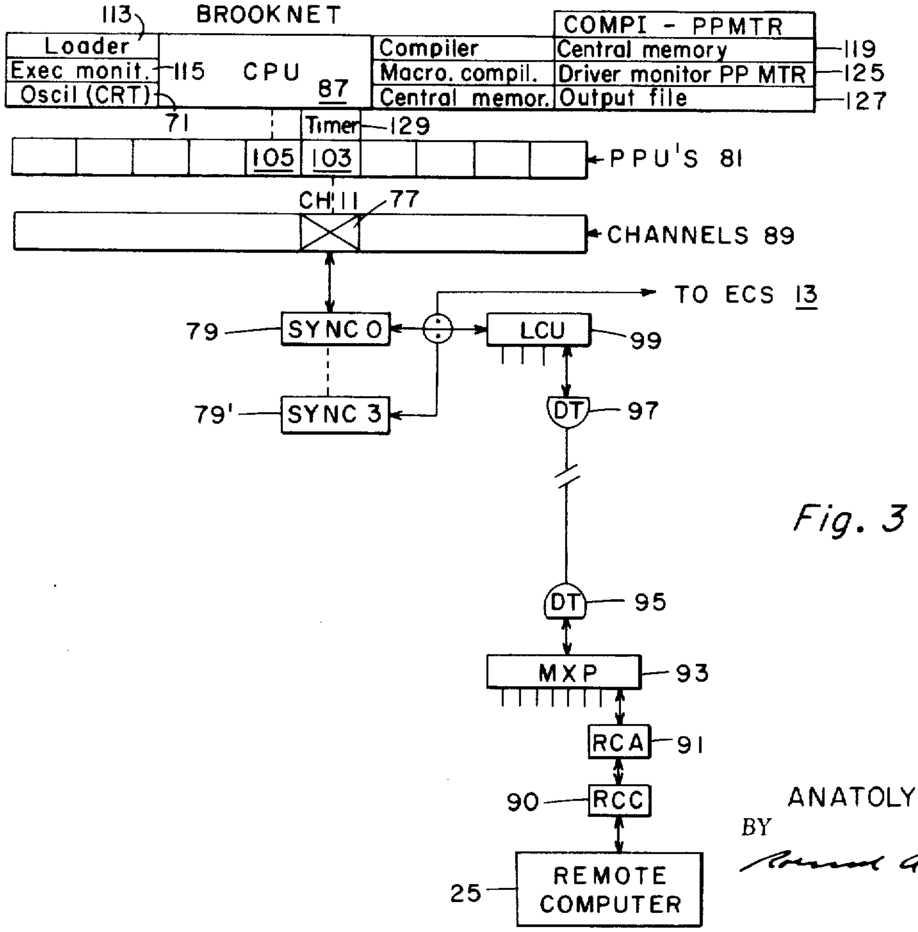
FIG. 3 is a partial schematic illustration of one arrangement of the data channels of FIG. 2.

As an example of such a "hang-up," reference is made to FIG. 3 which illustrates remote computer 25 connected to CPU 87 through a conventional remote computer control 90, remote control adapter 91, multiplexer 93, data terminals 95 and 97, local control unit 99, synchronizer 79, which may have one or more other synchronizers 79' and channel 77, which may be connected and have access to CPU 87 through any PP 81. In this example, it is desired that these elements transfer bits and bit streams in the form of non-mental data words from remote computer 25 into CPU 87 of CSCF 11 for storing and/or fetching these data words for various non-mental arithmetical and logical operations and manual or programmed read outs in printers 59 and 61 or display 71, etc., in accordance with non-mental software instructions fed into the memories of the various components, e.g., through CR's 51 and 51', CPC's 53 and 53', teletype 27, PDP–8 29 and/or through switch 31. In this regard, this transfer of the electrical signals corresponding to the bits of the bit streams and data words depends on the non-mental software to provide specific programmed non-mental instructions. Thus, for example, the hardware of remote computer 25, PP' s 81 and/or CPU 87 of CSCF 11, must open and close specific switches to transfer in an orderly fashion the various bits, which correspond to the input from remote computer 25, to specific memory components of these elements, ECS 13, disc 37 or tape 39, for storage therein and fetching therefrom for the various arithmetical and logical operations desired. Consequently, the lack of the correct connections, the failure of a particular hardware component, or the lack of the correct specific non-mental instruction will prevent these elements, e.g., one of the PP's 81, from transferring the incoming bits past that element. In this example, therefore, a PP 81, e.g., PP 103, will "hang-up" due to a failure in one or more element of some of the various pieces of hardware, or an error in one or more of the various non-mental programs.

The "hang-up" may occur in the middle of a data word, or at the beginning or end of such a word, that comprises several bits or bit streams. Therefore, incoming data would normally be lost. Also, heretofore the entire CSCF would often require complete shut-down to diagnose the failure or error, and this resulted in expensive downtime.

Should the transfer of the bits, bit streams or words to the desired location or memory be continuously self-monitored by a portion of CPU 87 in connection with its operation with a PP, e.g., PP 103 so that every time there is a potential or actual failure of the desired transfer, a substitute non-mental data absorber automatically provides a substitute transfer to a specific substitute piece of hardware for absorption thereby, for example to and by a portion of PP 105 in accordance with this invention, the hang-up can be prevented, recorded, diagnosed, and/or removed in an orderly fashion without shutting down the entire CSCF 11 while the CSCF 11 still performs its regular or innumerable other jobs for remote computer 25, etc., and/or in connection with any of the mentioned inputs-outputs 47 and 49. To this end also, in accordance with this invention the specific piece of hardware where the hang-up occurred, e.g., PP 103, automatically self-controlled itself for revival of its service on the regular job performed thereby before the hang-up occurred therein. Additionally, the described continuous self-monitoring of the desired transfer, e.g., of bits from remote computer 25, automatically self-regulates itself to continue independently of the original "hang-up."

In this regard it is advantageous to provide a time-based diagnostic method of operating the above-described embodiment, which is illustrated in FIGS. 2 and 3 for providing self-analysis of the functional integrity of the above-mentioned remote input-output devices coupled to one of the described or other like data channels, which are collectively referred to hereinafter as channels 89. To this end, it is advantageous to connect computer 25 to CSCF 11 through channel 77 for operation of the Brooknet computer system 21. In one embodiment of an actual failure, the data channels 89 all selectively couple to all the PP's 81, and all these PP's 81 selectively couple to CPU 87 in operable association with suitable synchronizers and clocks, such as the above-described clocks. In this environment, the method of this invention is performed exclusively by the described self-actuating hardware, and comprises the non-mental steps of providing in the CPU 87 a first non-mental stored program hereinafter referred to as PPMTR, for providing communication between a first one of said PP's 81, e.g., PP 103, and said CPU for activating a second non-mental stored program, hereinafter referred to as AYN, in one of said PP's e.g., PP 103, said second non-mental stored program providing checks on the validity of the commands to and the validity of the responses from said one of said remote device, e.g., remote computer 25; and when said PP 103 becomes "hung-up" after the fact of a failure, e.g., in response to an invalid response from said device, then couples a second one of said PP's 81, e.g., PP 105, to said channel 77 and activates a third non-mental stored program, hereinafter referred to as AIK, in PP 105, for restoring the functional ability of said PP 103; and providing in connection with said standard synchronizers and clocks, sequential time-based output information relating to the state of said device 25, whereby said computer system 21 retains its normal functional integrity independently of the functional integrity of said device 25. As will be understood in more detail hereinafter, the diagnostic of this invention also utilizes these same elements and programs to prevent failures before the fact in a failsafe manner, e.g., in the case of an invalid command function. Also, the method of this invention, treats the computer diagnostic process as another job without requiring dedication of the entire central processing unit i.e., CPU 87.

Figures 4, 5:
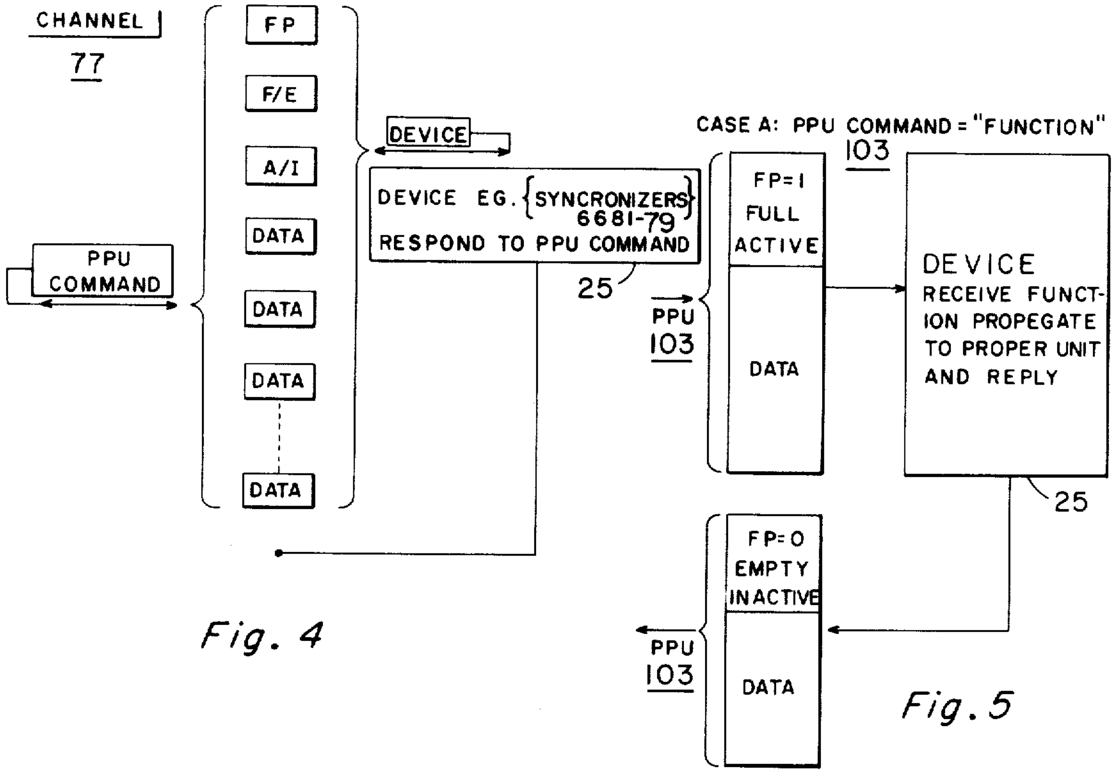
FIG. 4 is a partial schematic illustration of one arrangement of one data channel of FIG. 3.
FIG. 5 is a partial schematic illustration of one condition of the data channel of FIG. 4.
Figure 6A:
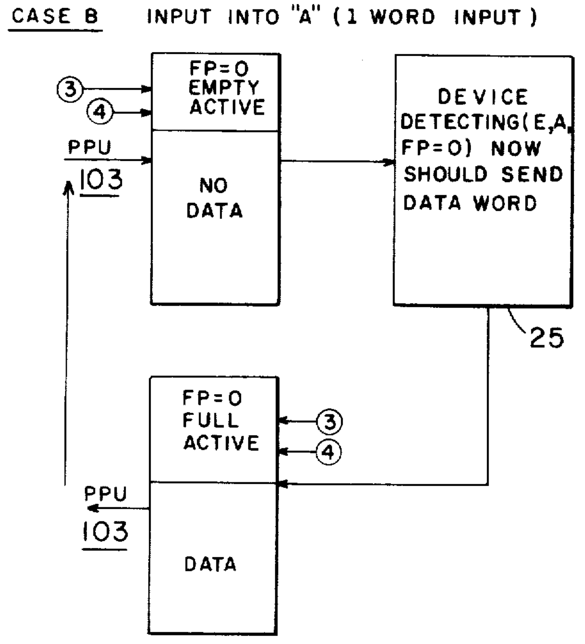
FIG. 6, which is comprised of FIGS. 6*a* and 6*b*, is a partial schematic illustration of another condition of the data channel of FIG. 4.
Figure 6B:
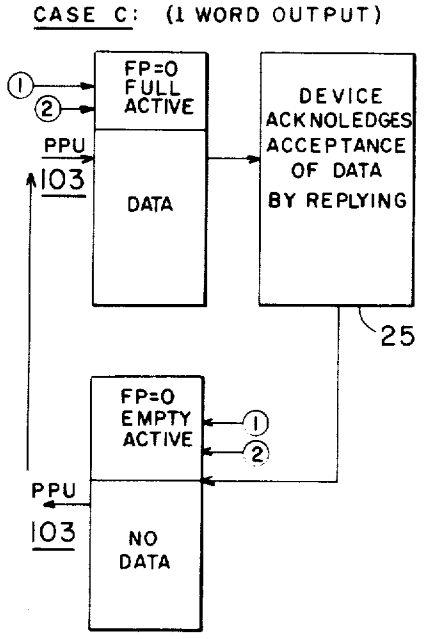

The synchronizers and clocks for the above-described method and apparatus, comprise the above-mentioned synchronizers which have suitable clocks, and couplers, which are illustrated in FIGS. 2 and 3 for operation with the mentioned stored programs to test channel 77, as illustrated in FIG. 4. To this end, the channel 77 is tested for function present, hereinafter referred to as FP. This involves the condition of the channel 77 to do certain activities, e.g., in connection with highly device dependent input and output activites, such as to set a conventional pick-up arm in disc 37, or to enlarge the size of the characters displayed by the CRT 71. Further tests, comprise the full/empty and active/inactive status of channel 77, hereinafter referred to as F/E and A/I. In this regard, these tests involve the directional F/E status of the channel 77 relative to whether the electrical condition thereof corresponds to bits from the CPU 87 to remote computer 25 or vice versa. Thus, for example, a directional full, i.e., predetermined bits (1) from the CPU to remote computer 25 is followed by a directional empty, i.e., predetermined bits (0), and this directional empty is followed by a directional full depending on whether the bits are transferred into CPU from computer or vice versa. The A/I status, refers to whether the channel 77 can receive or not. When active, the channel 77 is either full or empty, and when inactive is only empty.

As illustrated in FIGS. 4 and 5, a command bit or bit stream from PP 103 crosses channel 77 to a device, e.g., 6681 synchronizer 79, in the form of "data," a "-data word," or as a "function" that propagates to the proper unit, e.g., remote computer 25, to produce a response in the form of a bit or bit stream. If the response returns to PP 103 as intended, there is no failure in the transmission from remote computer 25. If the response does not come back to PP 103, there has been a failure. Since the described hardware and the operation thereof with the correct non-mental software makes sure that the channel 77 is inactive prior to the issuance of the function, this assures when the function is issued that PP 103 will go to the next command. Then PP 103 waits for a reasonable length of time for an inactive signal, thus determining that the device accepted (i.e., recognized) the function, whereby the functions are issued sequentially periodically until there is a failure or error in the transmission in which case the failure is logged, and, depending on the gravity of the error, PP 105 comes in to substitute for PP 103, to remove the "hang-up," and to reactivate PP 103 to the next command sequence.

In accordance with this invention it is advantageous to provide the above-described diagnostic to de-bug the Brooknet system 21 without additional hang-ups in PP 81 and without destroying any data bits, bit streams, data words or command functions. This is particularly significant, since each and every PP 81 can undo what any other PP 81 can do. To this end, this invention provides a fail-safe non-mental software diagnostic, hereinafter referred to as Quest.

Quest is implemented as an independent non-mental subsystem, comprising a compiler 111, loader 113, and an execution monitor 115, which enable Quest to run in harmony with the above-mentioned CDC Scope operating system at the above described CSCF-11 and peripheral equipment 19, as described above and in more detail hereinafter.

To permit this as a non-mental job, a Fortran-like language is advantageously an integral part of Quest for enabling the user to write programs for execution in a portion of PP's 81 in such a manner that hardware failures from a device, and fatal software logic errors do not cause the PP's 81 to "hang-up," i.e., the user programs can be totally protected in relation to the system oration, thus enabling the user to run during actual production, as described above.

Basically, the Quest non-mental software, comprises three interacting non-mental programs, referred to above as PPMTR, AYN, and AIK, which in actual practice correspond for convenience to actual deck names for the system used in conjunction with Brooknet called Scope. The Quest hardware, comprises two basic elements. The elements are a central memory part 119, and PP parts, which comprise an AYN portion of PP 103 and an AIK portion of PP 105.

Each Quest job submitted by a user in the Quest language discussed in more detail hereinafter, is read, e.g., in CTR 71 one card at a time, which corresponds to a non-mental Quest command. If the card is not a command card, the card is copied verbatum to the output medium (i.e., printer 59 or 61), otherwise it is passed on to the macro compiler 121, referred to hereinafter as COMPI, which is in a portion of CPU 87 in CSCF 11. This COMPI generates the non-mental code associated therewith and builds up the variable and transfer tables corresponding thereto, which is a RAW CODE. When the last card is encountered, which is designated hereinafter as EOF, a preliminary error check is made. If there are no errors, control is passed to loader 113, which satisfies all variable and transfer references and packs the raw code to the PP code according to a fixed relocation scheme.

If no errors are detected and execution is desired, the initial call of arguments (40 PP words) are set up in the PP-CPU communications area and the generated code is appended to it (maximum is from 2,000 to 7,752, i.e., 5,752 PP words of code).

Control is then turned over to the driver monitor 125, hereinafter referred to as PPMTR, the PPMTR calls a pool PP e.g., PP 103 to load AYN, and as soon as AYN has accepted the arguments; it reads the generated code. Now both non-mental programs operate concurrently with PPMTR, directing and checking the activities of AYN. AYN must respond to the CPU 87 every 200B recalls (about 7 seconds, unless the timer command is used).

All AYN output messages are sent to the output file 127 and the central processor timer 129 of the PP (e.g., the PP-CPU timer of PP 103) is reset. However, there are AYN messages that are not sent to the output file 127, their sole purpose being to insure proper PP and CPU (i.e., PP 103 – CPU 87) communication.

Should AYN not respond in the allotted time interval, PPMTR calls a second PP, i.e., PP 105 and its stored non-mental program AIK to find out about the state of the AYN in PP 103. The AIK in PP 105 reports its findings to PPMTR who directs the latter either to recover AYN or to exit. This involves, (1) Quest routines and their interaction, (2) general flow, (3) flows and communications, comprising COMPI, LOADIT, AYN, and AIK, (4) sample program, (5) AYN resident routine index with timings, and (6) peripheral command flow timings.

In an example of the AYN command index, the contents of CCI, a cell in AYN, corresponds to the following COMPILER MACROS: 0 argument check; 1 code check; 2 function; 3 inputs; 4 input; 5 input*n*; 6 outputs; 7 output; 10 output*n*; 11 sense; 12 compare; 13; 14 purge; 15 to go; 16 end; 17 call; 20 do; 21; 22 go; 23 print; 24; 25 *f*input; 26 *ff*input; 45 argument error; 47 argument accept; 50 abort CPU 87; 51 begin pause; 52 end pause or end message; 53 print; 54 begin message; 55; 56 normal Quest termination; and 57 AYN active reply to CPU 87.

An example of the AIK command index, comprises: 60; 61 PP 103 is hung; 62 PP 103 is active; 63; 64 recovery terminated; 65 AIK is aborting due to an error; 66; 67.

An example of the PPMTR command index, comprises: 77 . . . 77xxxx; IF; xxxx = *o* abort; xxx = 1 - recover normally; xxx = 2 - abnormal recovery (DCN).

The Quest language for the described Brooknet computer system 21 involves, (1) a format of a Quest statement; (2) elements of Quest, comprising variables and constants; (3) the environment and program definition for Quest, comprising Quest, Select and Sub; and the Quest repertoire, comprising the following input/output (i.e., I/O) commands: (a) inputs, input*n*, input, outputs, output*n*, output, function, *f*input and *ff*input; the following storage allocation: Dim; the following replacement statements: set, add, shift, index, store, and mask; and the following control statements: go to, go, do, term, call, return, end, sense, compare, purge, print, no print, msg, pause; the following deck organization: Example, the following printouts: dayfile messages and output format; and console control; and extensions.

Figure 7A:
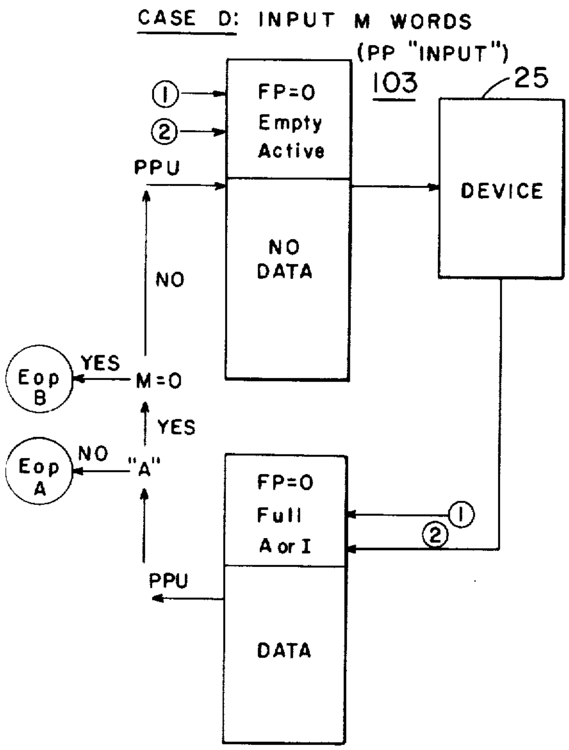
FIG. 7 is a partial schematic illustration of still another condition of the data channel of FIG. 4.
Figure 7B:
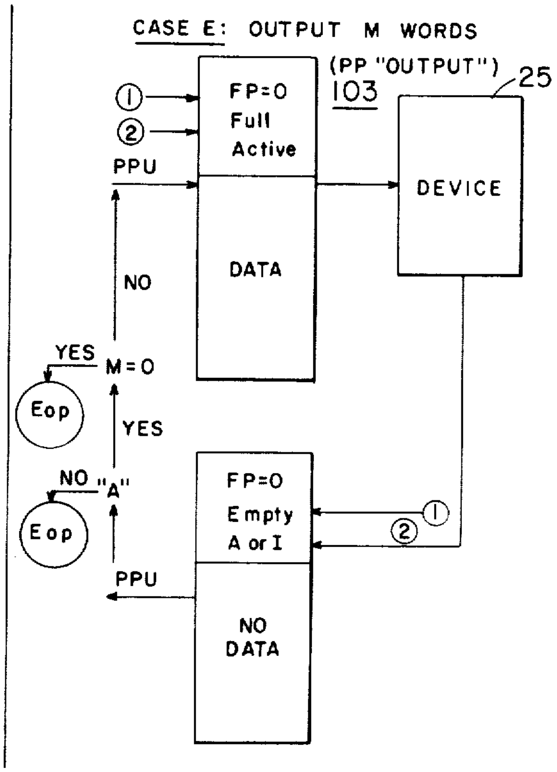
Figure 8:
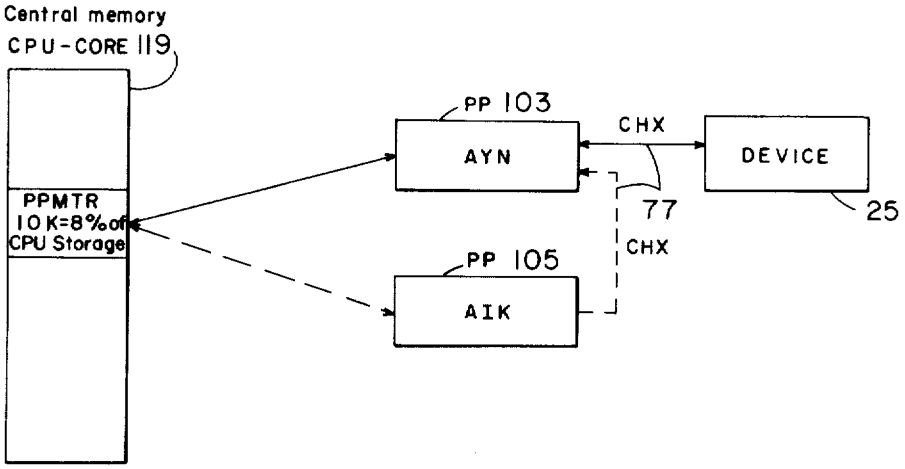
FIG. 8 is a partial schematic illustration of the apparatus of FIG. 2, showing in simplified form the apparatus of this invention.

Regarding the above-mentioned Extensions, the above described Quest I/O system illustrated in FIG. 7 was designed for a user with dedicated equipment with the user in control of selecting and deselecting the equipment. The channel could still be shared with an existing driver, but it was advantageous to provide fail-safe protection for the type of functions issued at execution. To this end, the user has two options: (a) he can execute in shared mode, in which case certain functions are inhibited from being issued (e.g., Master clear and mode 2 select) or (b) he can execute in non shared mode. In this mode no other user may share the channel for the duration of the test — but no functions are inhibited.

Since heretofore, if the proper "MAC" (Multiple access controller) switch was not deselected by the user it could deactivate the channel, this invention provides a select sequence to properly access the remote device with inherent fail-safety. To this end, therefore, this sequence deselects the 6681 synchronizer, selects the proper "MAC" switch and provides an input corresponding to the proper "MAC" switch status. If ready, control is given to the user. Otherwise, the deselect sequence gives up the channel or waits for a ready signal, i.e., a message to the console operator. The deselect sequence deselects the "MAC" switch 31 and gives up the channel, the synchronizer 6681 already being deselected. This permits the addition to the switch capability and the addition of further MACROS.

Also, this invention provides fail-safe accessing of CDC 3xxx equipment, illustrated in FIG. 1 as units of peripheral equipment, i.e., Peripheral Equipment, and illustrated in FIG. 2 as comprising discs, tapes and tape controllers, print controllers and printers, and displays. To this end, for the shared mode execution described as option A, the sequence provided, comprises: disable certain 6681 synchronizer functions (e.g., master clear and mode select); select/deselect the 6681 synchronizer; select/deselect the unit; and disable all but *o* xxx functions to the unit.

Some controllers can perform I/O functions on the unit after an N drop to the Quest job is given. Thereupon, the job drops and the PP exits. However, the unit is still actively performing the last I/O task whereupon the unit must be turned off, which can only happen in the protected mode on 3 xxx type equipment. Using the unprotected mode, this will not happen since the PP will master clear the channel prior to exiting.

Referring now in more detail to an actual example of one embodiment of the user documentation for the above-described diagnostic, referred to herein as the non-mental Quest software package, the following is a table of the "command index," the "AIK-command index," and the "CP command index:"

TABLE VII

| COMMAND INDEX | ACTUAL COMMAND | | |
|---|---|---|---|
| 0 | PAR. CHECK | 26 | FFINPUT |
| 1 | CODE. CHECK | 50 | MTRABT |
| 2 | FUNCTION | 51 | BEGIN PAUSE |
| 3 | INPUTS | 52 | END PAUSE |
| 4 | INPUT | 53 | PRINT |
| 5 | INPUTN | 54 | UNUSED |
| 6 | OUTPUTS | 55 | UNUSED E |
| 7 | OUTPUT | 56 | NORMAL TERMINATION |
| 10 | OUTPUTN | 57 | MESSAGE |
| 11 | SENSE | | |
| 12 | COMPARE | | |
| 13 | | | |
| 14 | PURGE | | |
| 15 | GOTO | | |
| 16 | END | | |
| 17 | CALL | | |
| 20 | DO | | |
| 21 | | | |
| 22 | GO | | |
| 23 | PRINT | | |
| 25 | FINPUT | | |
| | (AIK-COMMAND INDEX | | |
| 60 | UNUSED | | |
| 61 | PP HUNG | | |
| 62 | PP ACTIVE | | |
| 63 | UNUSED | | |
| 64 | RECOVERY TERMINATED | | |
| 65 | UNUSED | | |
| 66 | UNUSED | | |
| 67 | UNUSED | | |
| | (CP COMMAND INDEX) | | |
| 70 | ABORT PP | | |
| 71 | UNUSED | | |
| 72 | UNUSED | | |
| 73 | UNUSED | | |
| 74 | UNUSED | | |
| 75 | UNUSED | | |
| 76 | UNUSED | | |
| 77 | GO | | |

In this example of the Quest software package, a compiler is required, which comprises three small Fortran-like language routines, i.e., TEST, ERROR, CODEP for I/O and an initial setup, two small compass routines (ISHIFT and DPFIX) for formating certain outputs and a large compass routine (COMPI) that does the actual compilation. COMPI comprises two main parts: a Command Processor (COMPI, ENTRY) and a Relocation Section (LOADIT, ENTRY).

Also, it will be understood from the following that a Command Processor (COMPI, ENTRY) is advantageously employed. This portion of the Quest software package, (1) decides on the function sought; and (2) processes this command to: (a) verify the arguments, (b) substitute the arguments into raw code, (c) initiate unsatisfied variable and transfer requests, and (d) store partially assembled code in a special array named CODE.

After the above described Quest software package is loaded from a permanent file on disk 37, initial environment parameters are obtained exclusively by the apparatus of CSCF 11 from a "user's program" card (such as the channel to be used, list and dump options, and whether or not execution is desired), as described in more detail hereinafter. In this regard, this card is located in the deck of cards corresponding to the "user's program" that is inserted into card reader 51. To this end also, as described in more detail hereinafter, information is punched into cards in the form of a "user's program" that is translated into a job, comprising binary electrical signals in the form of bits for storage on a disk, such as disk 37 and subsequent removal to CPU 87. Thus, when this "user's program" is scheduled by CSCF 11 as a regular job independently of the Quest software package, the "user's program" job is transferred automatically and exclusively by CPU 87 from the disk 37 to a portion of the central memory 119 of CPU 87.

Referring more particularly to the above-mentioned deck of "user's program" cards, this deck advantageously comprises a job card; the job card being the first card in the control card record, e.g., for use in connection with the CSCF 11, followed by control cards that tell the operating system, i.e., the CPU 87, the makeup of the "user's program" job as a regular job by CSCF 11. What follows are the Quest command cards. In this regard, this "user's program" has been transferred from the card reader 51 to the disc 37 and subsequently to a portion of the central memory 119 of the CPU 87 for operation in connection with the Quest software package when the system of CSCF 11 is ready to operate on this remote computer "user's program." As noted, however, the Quest software package job must also be requested by CPU 87 from the permanent file on disk 37 in accordance with the "user's program"

for the remote computer "user's program" job in CPU 87. The "user program" becomes input data for the Quest compiler. The quest compiler must reside in the CPU 87, and will process the user job "one card record " at a time.

| | | |
|---|---|---|
| [example] | Job card<br>Control cards<br>EOR | User's program control record = control cards |
| | Quest Card<br>Quest Commands<br>EOF | User's program = Command Cards |

1. The Job Card - Specifies the makeup of the job to the operating system, such as:
   - How much core is required for the job
   - How much time is required for the job
   - How many print lines the job has
   - Which billing account it is
   - How many tapes the job uses
   - How much ECS space is required When the requested system resources become available, to the operating system it schedules the "-job" for execution.

2. The Control Cards — in the case of the Quest job, preforms the loading of the Quest subsystem as a job.
3. The Command Cards — are data cards to the Quest subsystem.
   a. Quest Card — specifies the "users" Equipment environment, i.e., which channel, execution, listing, etc.
   b. The remainder are the tasks to be performed.

To actuate the request for the described Quest software package, which request is made as a regular job by CPU 87, the remote computer "user's program" job control records are stored in CPU 87. Then the information stored therein continues to the control card in card reader 51 of this particular "user's program" job whereby CPU 87 brings into CPU 87 the described Quest software package from disk 37 where this permanent file is stored. This causes this Quest software package to be transferred from this permanent file of disk 37 into a portion of the memory of CPU 87. Thereupon, CPU 87 automatically processes the information in CPU 87 corresponding to next control card of the above-mentioned remote computer "user's program," which will be understood from the above to be the command to execute the Quest subsystem. Thus, this Quest subsystem is automatically executed exclusively by CPU 87 in connection with the described Quest software package that was transferred from the permanent file of disk 37 to a portion of the central memory 119 of the CPU 87.

The Quest subsystem now reads the "user's program" and processes it according to the user's specifications. The first "card" of the user's program must be the "Quest" card describing the user's execution environment. The remaining cards are the actual command cards, the last card in the user's program must be the end card.

In understanding this "user's program" job, it will be understood that the above-mentioned initial environment parameters are handled in the particular portion of the above-mentioned "user's program" of the remote computer job that is transferred from card reader 51, to disk 37, to CPU 87 when the referred to job is scheduled by CSCF 11. The particular portion of the "user's program" for this remote computer job is referred to for convenience hereinafter as the Command Section thereof. When the "END" card of this "user's program" is detected, as described in more detail hereinafter, the Relocation Section of this "user's program" for this job is called.

As will be understood in more detail hereinafter, each word of the special array CODE of the Relocation Section contains a tag that indicates what type of action to take on that particular word before extracting the lower twelve bits as part of a final PP program, e.g., in PP 103 as described in more detail hereinafter in connection with the non-mental program AYN therein. In this regard, as also described hereinafter is more detail in connection with the INTERNAL MACRO STRUCTURE, the loader LOADI: (1) allocates storage for all variables and arrays; (2) picks up the words from CODE and modifies them according to the above-mentioned tag to trigger such things as table look up for the absolute address of a variable, a request for an address relative to a present position, and other things necessary to link the code; and (3) extracts the lower 12 bits and packs them into full 60 bit words, whereby the code is ready for PP execution by PP 103 according to AYN if no errors occurred.

Relative to the above-mentioned MACRO STRUCTURE, the following table illustrates one embodiment of an actual MACRO STRUCTURE:

TABLE VIII

INTERNAL MACRO STRUCTURE:
A 60 bit word is used:

| CODE | MNEMONIC | ABS |
|---|---|---|

CODE: The 12 bits are TXXX

T=RELOCATION TYPE
XXX=THE OCTAL COUNT
T—CODES:

| | |
|---|---|
| 0 | NO RELOCATION |
| 1 | CHANNEL SUBROUTINES |
| 2 | REL. FORWARD, XXX PLACES |
| 3 | REL. BACKWARD, XXX PLACES |
| 4 | ABSOLUTE XXX ENTRY |
| 5 | VARIABLE ALLOCATION |
| 6 | TRANSFER ALLOCATION |
| 7 | END OF CODE |

RELOCATION TYPE 4 TABLE ENTRIES IN USE:

| | | |
|---|---|---|
| 0 | ILLEGAL | |
| 1 | MTR1 | AYN MONITOR |
| 2 | MTR2 | STATUS IN SHIFT ROUTINES |
| 3 | ERRACT | ERROR ACTIVE PROCESSOR |
| 4 | ERRINA | ERROR INACTIVE PROCESSOR |
| 5 | ERRFUL | ERROR FULL PROCESSOR |
| 6 | ERREMP | ERROR EMPTY PROCESSOR |
| 7 | ERRORS | COMPARE ERROR PROCESSOR |
| 10 | MTRABT | EXECUTION ABORT |
| 11 | PAUSE | ENTRY TO PAUSE |
| 12 | ERRXT | ERROR TRACE BACK |
| 13 | STATUS | LAST INPUT (MOST CURRENT STATUS) |
| 14 | ONE | CONSTANT 1 |
| 15 | PRINT | PRINT ENTRY |
| 16 | MSG | MESSAGE ENTRY |
| 17 | TEMP | USER TEMPORARY |
| 20 | TEMP 1 | USER TEMPORARY |
| 21 | | OPEN |
| 22 | | OPEN |
| 23 | FUNC | CHECK FUNCTION |

From the above user documentation, it will be understood that Tables IX through XII represent actual operating sequences in the form of flow diagrams:

TABLE IX
| Code | Name | Time (Major cycles) |
|---|---|---|
| OAM 73 | Output (A) words fm m on channel d | 4 plus 1/word |
* = Memory Ref.
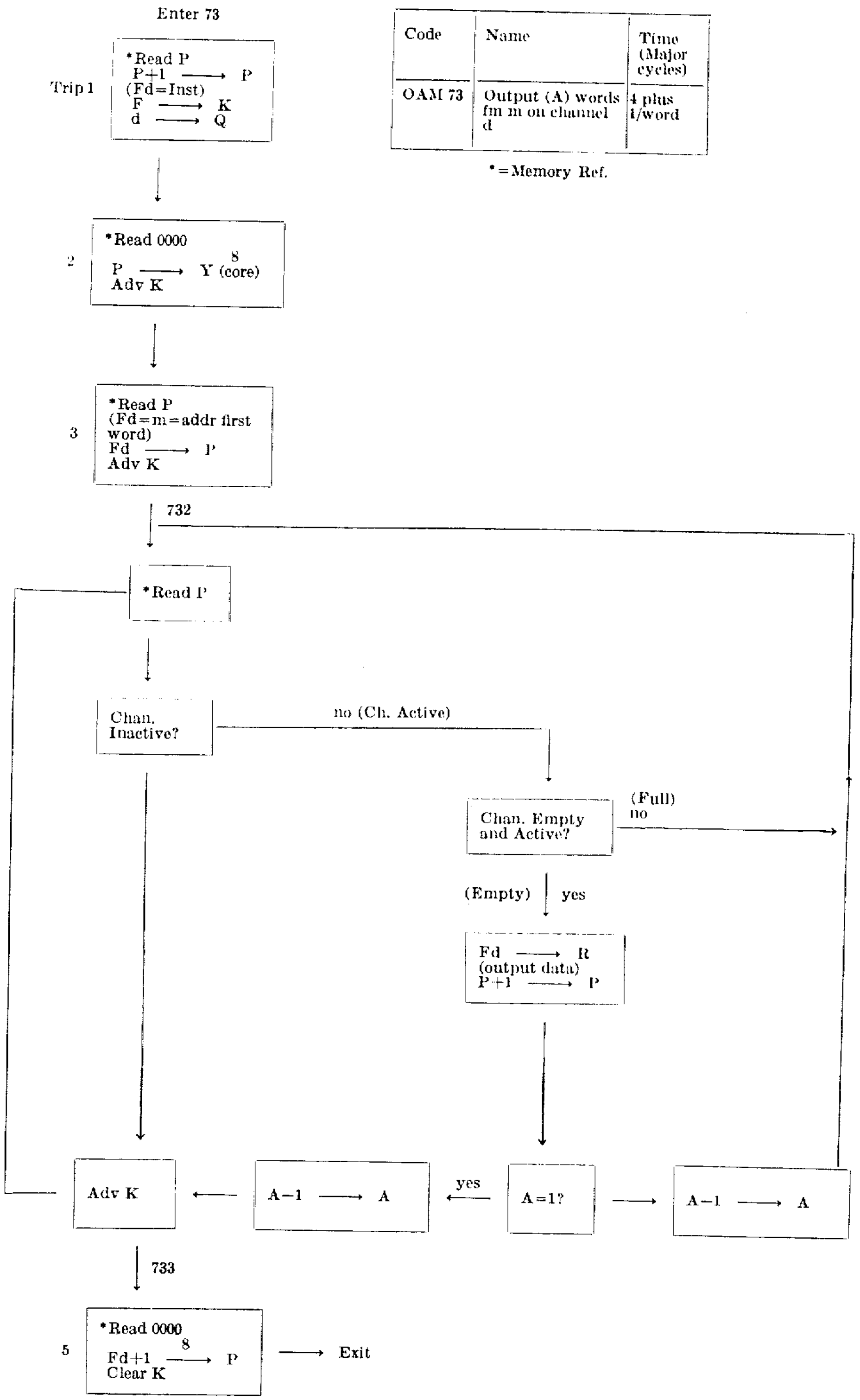

TABLE X
| Code | Name | Time (Major Cycles) |
|---|---|---|
| OAN 72 | Output from A on channel d | 2 |
*Memory Ref.
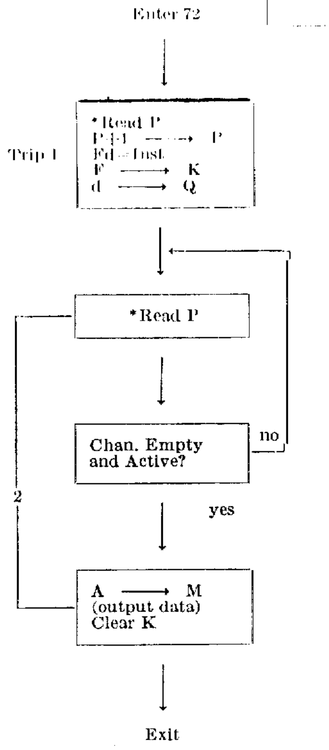
TABLE XI
| Code | Name | Time (Major Cycles) |
|---|---|---|
| IAM 71 | Input (A) words to m from chan d | 4 plus 1/word |
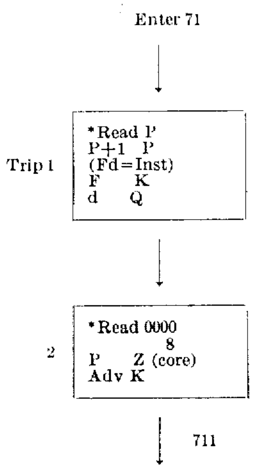

Table XI – Continued
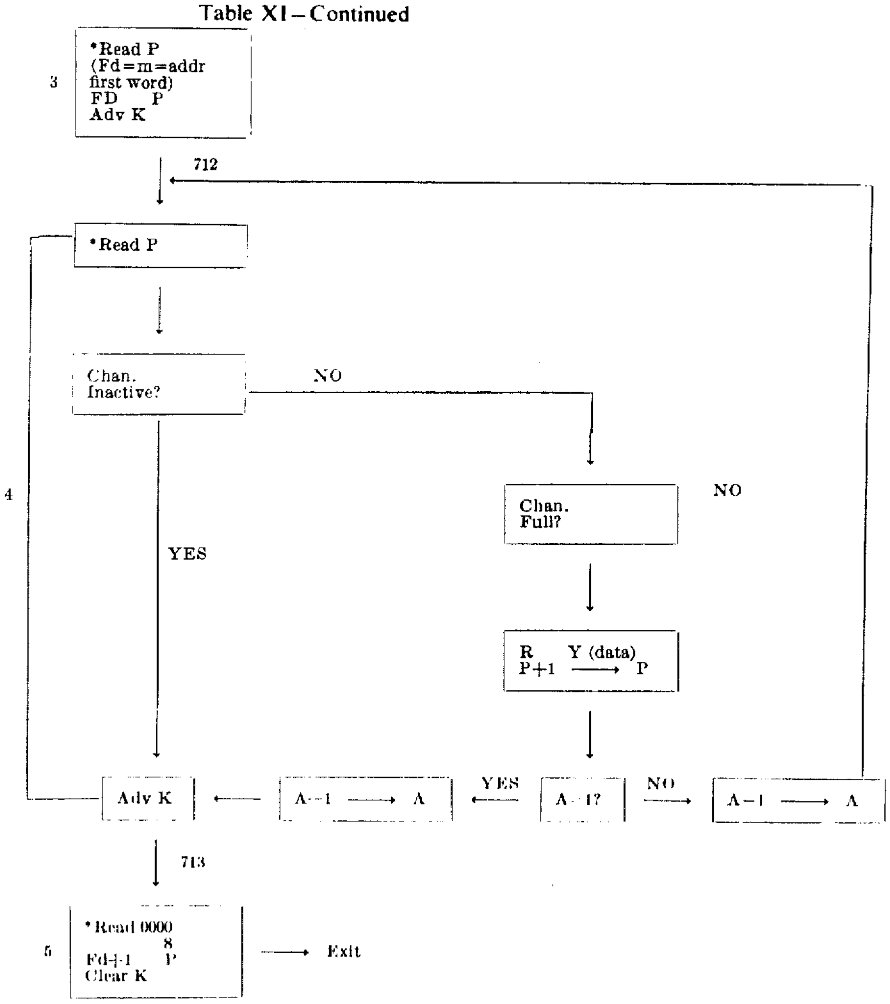
TABLE XII
| Code | Name | Time (Major Cycles) |
|---|---|---|
| ACN 74 | Activate Channel d | 2 |
| DCN 75 | Disconnect Channel d | 2 |
| FAN 76 | Function (A) on Channel d | 2 |
| FNC 77 | Function m on Channel d | 2 |
*=Memory Ref.
Enter 74–77
↓

Table XII – Continued

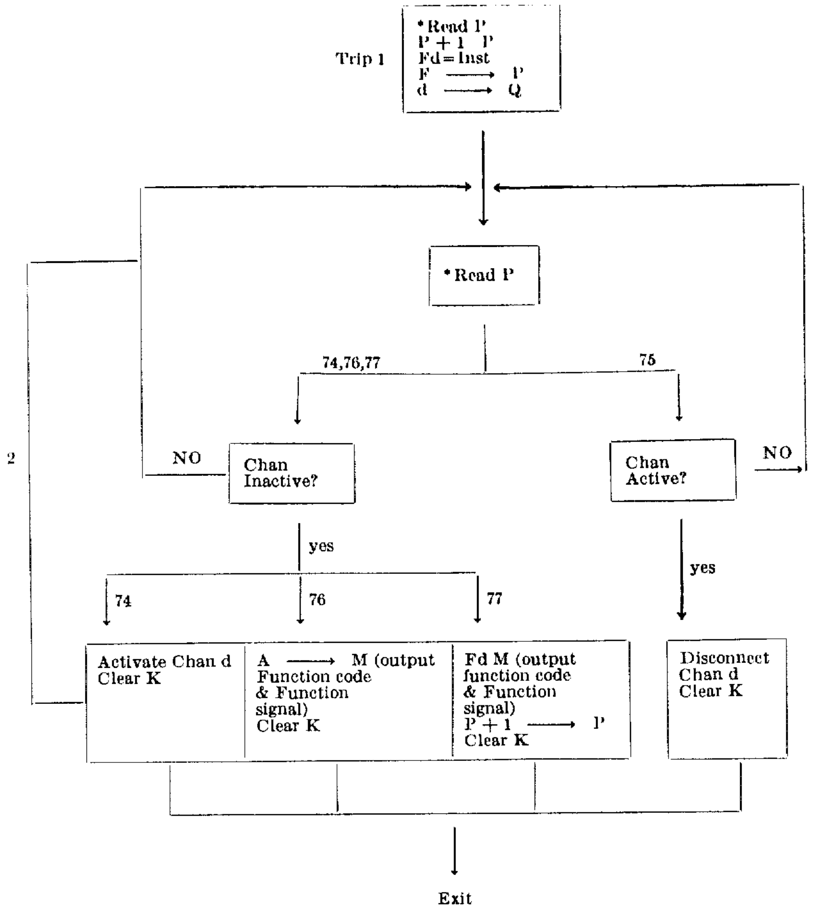

In regard to the above, the following Table XIII illustrates an actual AYN STRUCTURE for PP 103:

TABLE XIII

AYN STRUCTURE

| | |
|---|---|
| LOC: | |
| 1-77: | PERTINENT EXECUTION CELLS |
| 1000–1775: | AVAILABLE SPACE FOR AYN RESIDENT |
| 2000–7777: | AVAILABLE CORE FOR USER QUEST PROGRAM (DATA AND INSTRUCTIONS). |
| 3000: | INITIALIZATION Area, gets overlayed by users program |
| NAMES & FUNCTION OF AYN RESIDENT ROUTINES: | |
| SCPMES : | ISSUE INFORMATIVE MESSAGE TO CENTRAL |
| CPMES: | ISSUE INFORMATIVE MESSAGE TO CENTRAL |
| CRDABT: | READ ABORT FLAG, if set ABORT |
| PRINT: | ISSUE STANDARD Print message to CENTRAL |
| WATT: | WAIT FOR RESPONSE ON STANDARD MESSAGE: USES: CRDABT |
| ERRFUL: | SAVE (INDEX, "A", "P"), SET FULL STATE TIME ON FULL (4*64μs), if full does not arrive SET FATAL, PROCESS FATAL ERROR (ERRORF). If full arrives, check print, if 10 print, return. |
| ERRACT: | SAME AS ERRFUL BUT ON ACTIVE |
| ERRINA: | SAME AS ERRFUL, EXECT NO TIMING, ERROR IS ALWAYS FATAL |
| ERREMP: | SAME AS ERRFUL BUT ON EMPTY |
| ERRORS: | NOT FATAL ERROR (SENSE or Compare), NO TIMING, SAVES (INDEX,"A", "P") uses ERRORF. |
| MTR2: | PUSH DOWN STACK OF 5 STATUS REGISTERS (INPUTS). |
| MTR1: | ALL TRANSFER and I/O commands enter here<br>1. Save command index and error transfer<br>2. If previous command was fatal check restart, if set clear fatal, recover and continue. (ELSE EXIT)<br>3. Check if it is time to communicate with the CPU (No Exit)<br>4. Check if channel can be released<br>a) No. Issue informative menage to CPU<br>b) Yes. Is current command an IO Yes exit. No. Go pause<br>5. Reset CPU communications timer and exit |
| ERRORF: | All fatal errors enter here and are processed |
| FUNCC: | Protects function to be issued by user according to equipment and protection type |
| DESEL: | Deselects equipment |
| SELL: | Selects equipment |
| QFUNCv: | Issue function |
| INPUT: | Input equipment status |
| MSG: | Message Procedure |
| PAUSE: | Pause procedure |
| TRAC: | Track keeps count of the number of times the program is to be executed. |
| START: | Initialization |
| VERCH: | Modifies all Ch. references |

Also, in this regard, the following Table XIV illustrates an actual AIK program for PP 105.

TABLE XIV

Recovery Driver (called by PPMTR)

AIK

AIK is called if AYN does not report back within (~6.4 sec of real time, 200$_8$ recalls). AIK receives from Central, CH & BA.

CH = The channel AYN is using.
BA = PP-CP communications area (10 locs.)
i.e. absolute RA + BA FUNCTION OF AIK:
1. Determine PP from channel
2. Check routine name at that PP and determine channel condition
3. Inform Central
4. Wait for reply
5. On positive reply (recovery), check channel, recover channel and exit Channel criterion for recovery:
1. Channel must be reserved
2. AYN must be the offending routine
3. Channel is tested for 3 states:
   I: INACTNE
   II: ACTIVE & FULL
   III: ACTIVE & EMPTY
   The channel must stay in any one state for 4*4096μs (~16 ms)
4. On recovery response from Central test 3 is repeated—followed by recovery if necessary

RECOVERY:

| | FOR: | ACTION: |
|---|---|---|
| I: | INACTIVE | ACN |
| II: | ACTIVE & FULL | IAN |
| III: | ACTIVE & EMPTY | OAN |

Special recovery procedure:
CENTRAL KEEPS TRACK OF THE RECOVERIES TAKEN
If the last 100 recoveries were of the same state it initiates a special recovery procedure.

a) INACTIVE STATE:
ISSUED MESSAGE TO OPERATOR TO DISCONNECT HARDWARE. (ACTIVATE FROM AIK IS PREEMPTED BY HARDWARE).
(JOB SHOULD BE DROPPED)
Recovery is initiated b) ACTIVE STATE:
ISSUES MESSAGE TO OPERATOR
(JOB SHOULD BE DROPPED)
Direct AIK to recover with DCN
AIK waits for AYN to DROP
If AYN DROPS, AIK EXITS
If AYN does not DROP, informs central and recovery is initiated AIK can be dropped anytime by typing
0000 0000 0000 0000 7654 into its MSB+5
(Last word in MSB)

AIK does not respond to operator DROP, ONLY ABORTS directed from Central or Manual A typical PPMTR flow for CPU 87 is shown in Tables XV and XVI.

TABLE XV

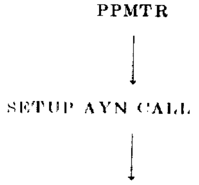

Table XV—Continued

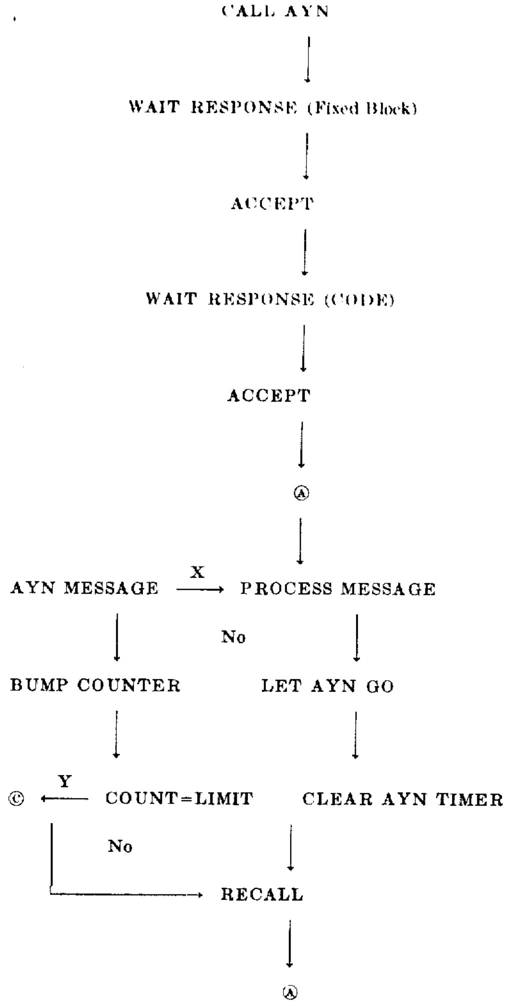

TABLE XVI

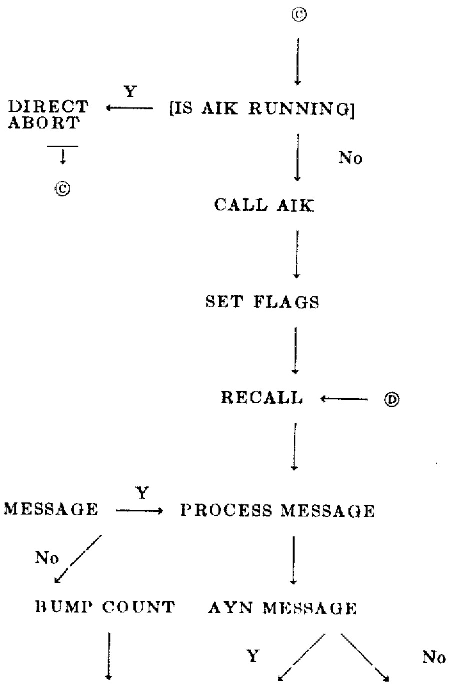

Table XVI – Continued

Ⓓ ←No— COUNT=LIM DIRECT AIK LIMIT ON RECOVERY ABORT

MESSAGE TO OP → RECALL → Ⓐ

RECALL → RESET TIMERS → Ⓐ

Y → MESSAGE TO OP → WAIT GO → DIRECT RECOVERY → Ⓓ

No → ISSUE RECOVERY → Ⓓ

A typical main loop AIK flow is illustrated in Table XVII through Table XXI, which illustrate individual flows pertinent to AIK as follows:

TABLE XVII

AIK FLOW

MAIN Loop

Clear MSG FLAG

↓

READ INPUT REG & PROCESS

↓

READ CONTROL POINT & PROCESS

↓

READ CST & VERIFY

↓

VERIFY ATTACHED PP

↓

MODIFY CHANNEL REFERENCES

↓

MONITOR CHANNEL

↓

RECOVER

↓

Tell central recovery complete (64)

↓

→ABORT (loop)

TABLE XVIII

READ INPUT REG & PROCESS

↓

Read IR of AIK., Save in Table (IR)

↓

Form Control point ADDR, Save in Table

↓

Save BA of Communications Buffer

↓

Get channel in usi, verify range

↓

EXIT

READ CONTROL POINT & PROCESS

↓

Get Control Point ADDR, Read WD=20

↓

Get RA, Form CM ADDR, SAVE IT

↓

EXIT

READ CST & VERIFY

↓

Form CST word from Channel, read it

↓

Is a PP attached —Yes→ Read SST entry, form PP-IR → EXIT

↓ No

ERROR ABORT

VERIFY ATTACHED PP

↓

Read IR of Hung PP

↓

EMPTY —Y→ ABORT

↓ No

IS IT AYN —No→ ABORT

↓ Yes

EXIT

Table XVIII—Continued
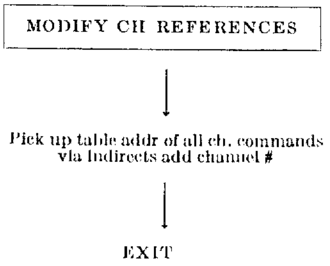
TABLE XIX
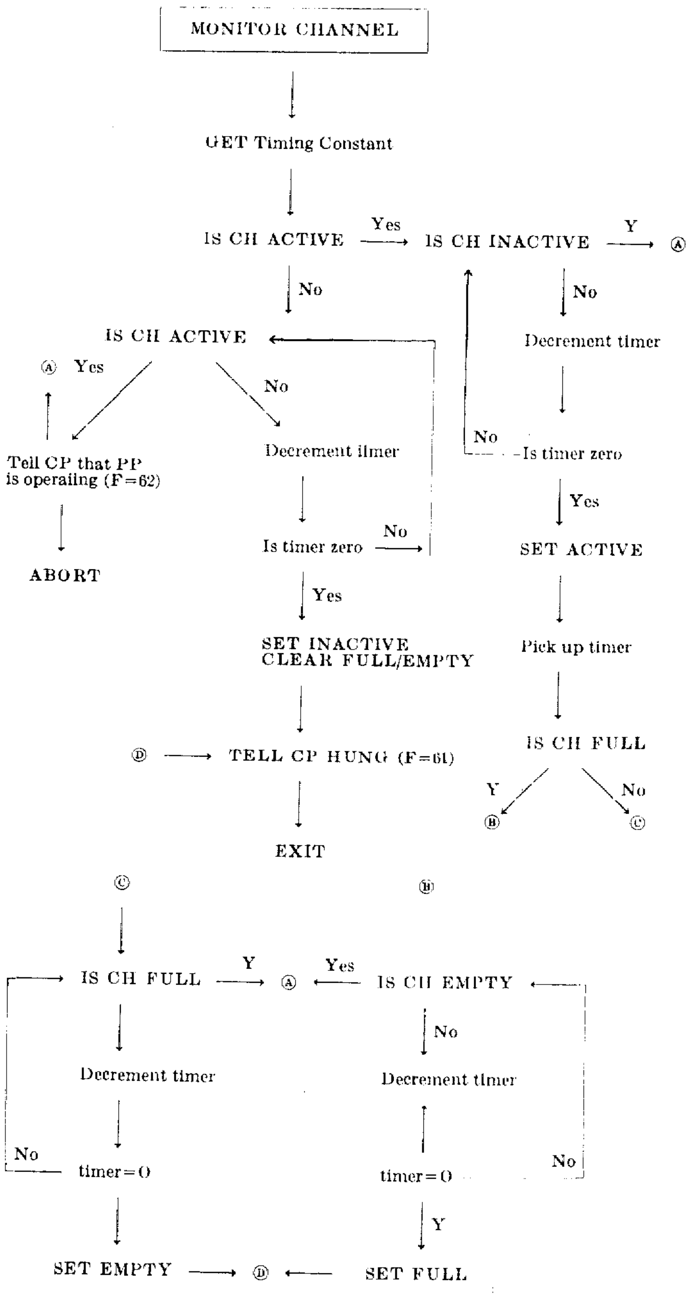

TABLE XX

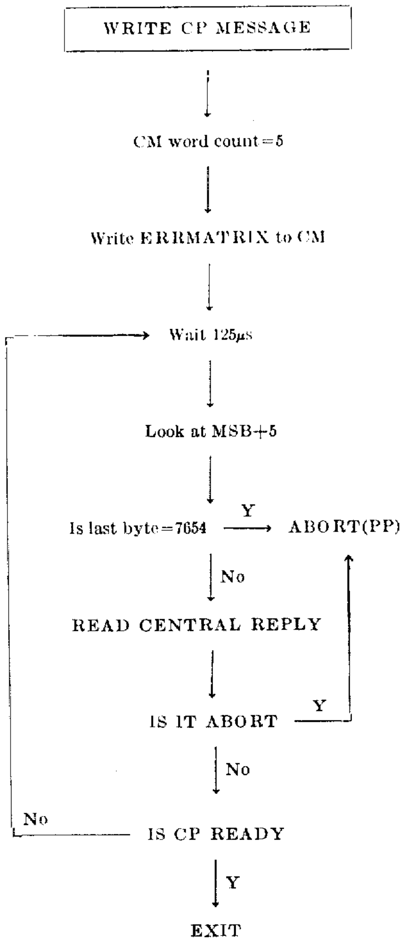

TABLE XXI

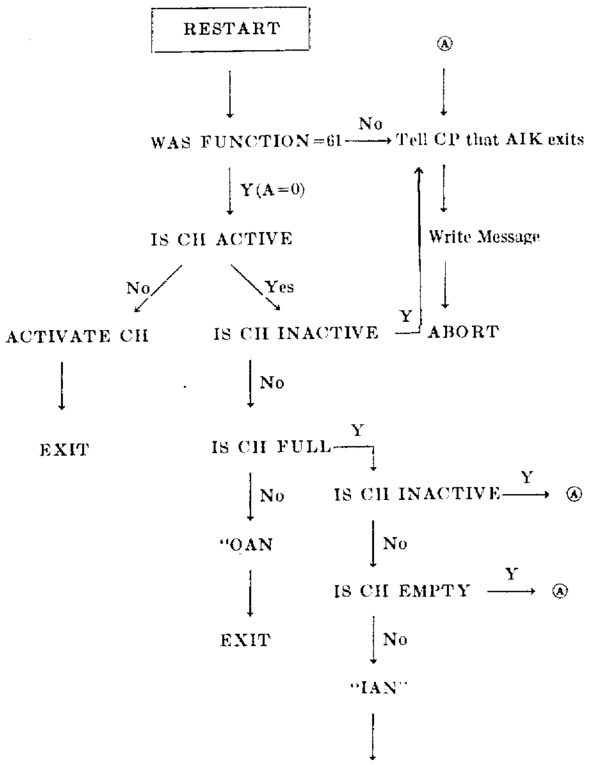

Table XXI – Continued

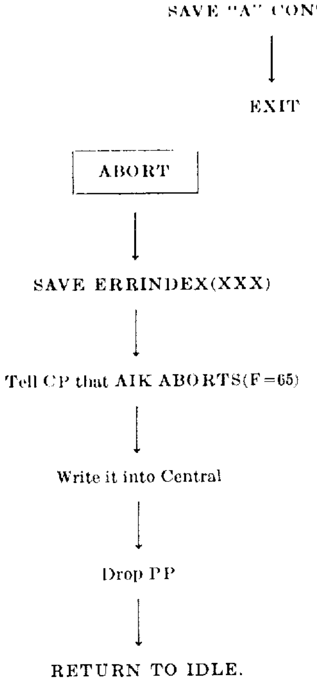

An example of the control record is given in the following

TABLE XXII

| | | |
|---|---|---|
| E.G. | JOB CARD<br>*QUEST<br>COPY BF (QUEST, PROBE)<br>RETURN (QUEST)<br>PROBE<br>EOR | This is the control record=RECORD |
| This is the job =FILE | EXAMPLE | This is the test =RECORD |
| | EOF | |

An example of a user's test is given in the following

TABLE XXIII

```
QUEST (CH=11, PR=2, LI, LO=1, EX)
C THIS PROGRAM SENDS A CHECKERBOARD TO THE CHEM REMOTE. THERE
C IS NO PRINTOUT. THE JOB RUNS UNTIL DROPPED BY THE OPERATOR.
C RUN AT C, F ONE FOR UNINTERRUPTED OPERATION
   10 SET (ONE,1)
   11 SET (TWO,2)
   12 SET (IND,0)
   13 SET (FUN, 2040)
   14 SET (WORD 1, 5252) ONE-ZERO
   15 SET (WORD 2, 2525) ZERO-ONE
   16 DIM (DATA, 62)
   17 SET (LIM, 62)
C THE FOLLOWING LOADS ARRAY CALLED DATA WITH THE CHECKERBOARD.
   20 DO (21, IND=ONE, LIM, TWO)
   21 STORE (DATA, IND, WORD 1)
   22 DO (23, (DATA, IND=TWO=LIM, TWO)
   23 STORE (DATA, IND, WORD 2)
   25 FUNCTION (FUN, 25)
   26 OUTPUT (DATA, 25, LIM)
   27 GOTO (25)
   28 END
      EOF
```

In regard to the above-mentioned actual embodiment of this sample "user's program" the deck of cards corresponding thereto will be described. In this example, the deck contains 29 cards that are processed through card reader 51 by an operator skilled in the art. That is to say, the operator using conventional hardware causes the card reader 51 to process the cards through the card reader 51. In this regard, the pattern and location of the holes punched in the cards correspond to data for processing by CPU 87 in connection with the testing and diagnosis of remote computer 25 for the desired operation in the described Brooknet System 21.

The first card of the "user's program" is called the job card. This job card designates the beginning of a new Quest-diagnostic job for CSCF 11, which processes each job in sequence according to assigned priorities. This job card sets up initial environment parameters to be used in processing the job and for accounting purposes. The latter involves an account number for charging the machine usage to a particular account number. The other parameters, comprises priority, time limit of the job, the field length, i.e., the maximum amount of printer lines that will be used in the printer 59, and the user's name. These parameters are useful in queueing and executing the job in an orderly and meaningful way according to the proper priorities.

The second card is a control card that brings into the portion of the central memory 119 of CPU 87 from disk 37 the permanent file residing therein that corresponds to the described Quest software package.

The third card copies the Quest subsystem onto a file called Probe for Execution. The fourth card releases the file Quest (for other users). The fifth card directs the system to load the file Probe (which contains the Quest subsystem) and to execute it; (the sixth card indicates to the operating system the end of the control record for the users job). To this end, the execution involves the information from the other "user's program" cards. As will be understood in more detail hereinafter with reference to the "user's program" deck of this example, these other "user's program" cards, comprise cards seven through 29. The sixth card merely represents a record separator that designates the end of the control cards and the beginning of the "user's program," (EOR) which is data that is processed by the Quest software package. Like all the other cards, information corresponding to the card holes is stored in a portion of the memory of the CPU 87, but for ease of explanation, this stored information will be discussed with reference to actual "user's program" cards corresponding to the respective stored information derived from each respective "user's program" card.

Card seven called the Quest card, sets up the initial environmental parameters for the actual test run. In this regard, in this example, this run is designated to test the remote computer 25 to see if it behaves as desired. First the Quest software package is informed that channel 11 is the channel to be used to communicate with the remote computer 25. Other parameters, comprise "print option two." This option tells the Quest software package to write out the Quest error matrix on any fatal errors to the job's output file, which resides on disk 37. Later, when the job output priority is high enough for printing, this information in the output file of disk 37 is transferred to and printed by printer 59 or 61.

Another actual option on this card seven in this example, is the "list option" having mnemonic LI, which is a binary type argument. The function of this option is to give a source listing of the PP code associated with the commands in the Quest "user's program," i.e., the cards in the deck of this example after the record separator card and before the last card of the deck, which is the "end of file" card, (EOF).

Another specified option on this actual card seven is the "loop option" having a mnemonic LO. This option functions to designate the number of times the entire "user's program" is to be executed. In this example, this is 1 time.

Still, another option on card seven, called the "execution option," functions to allow execution of the "user's program" when there are no logical errors in the "user's program." Other possible options for the cards in accordance with this invention, comprise a "-dump option" that functions to point out exactly what is in the memory of PP-103. Another option, called the "restart option," whose mnemonic is RE, functions to continue the "user's program" upon encountering a fatal error. In an actual example that lacks this option, the whole job aborts upon encountering a fatal error. A sample "user's program" card seven with these additional latter above-mentioned options thereon would correspond to:

CH = 11, PR = 2, LI, LO = 1, EX, DU, RE

Card eight to card 29, comprise the remainder of the "user's program," and comment cards. Thus, for example, cards 8, 9, and 10, describe some feature of the "user's program" for the convenience of the user and cards 11 – 29 comprise an actual sample Quest "user's program" as illustrated heretofore in TABLE XXIII.

In operation, cards 11 – 29, except for the comment cards C, are accepted as data by the Quest software package now in a portion of the memory of CPU 87, and from this data the necessary PP code is automatically produced solely by CPU 87 to accomplish the testing of the remote computer 25. In this regard, this sample program generates an alternate bit pattern (i.e., a checkerboard) of 62 words and sends this pattern to the remote computer 25. Thereupon, if there are any fatal hardware errors the user will be informed thereof by the printing of the Quest error matrix on the user's output file which can be printed by printer 59 according to the print option as described above.

In this regard as shown in TABLE XXIII, certain constants are set up by the set commands of cards 10 – 15 and 17, such as are understood by one skilled in the art of conventional FORTRAN language. Thus, constants 1, 2, 0, 2,040 and 62 are set up for the user thus to accomplish the above-mentioned sending of the particular bit pattern to the remote computer.

The alternate bit patterns of cards 14 and 15 form the checkerboard by providing the necessary words, which are repeatedly stored (62 times) in the form of an alternate bit pattern in the array called DATA of card 16.

Cards 20 – 23 actually set up the above-mentioned alternate bit pattern in a portion of the memory of PP 103, similarly to accomplishing a FORTRAN "do" operation a specified number of times (i.e. 62 times) and varying a constant in a specific way. In this case, the constant IND changes in value from 1 (i.e. ONE) to 62 (i.e. LIM) in steps of two (i.e. TWO). Stated another way, this would be equivalent to the progression 1, 3, 5, . . . 61.

The STORE command of card 21 sets every other word starting with card ONE of the array called DATA to the value 5252 (i.e., WORD 1). The next two cards 22 and 23 also form a "do" loop that does everything that the preceding two loop cards 20 and 21 did, except starting at word 2 i.e., the second word of the data array) and alternately sets every other word to the value 2525 (i.e. WORD 2). This, for example, is equivalent to the progression 2, 4, 6, . . . 62 to cover each position not covered by the preceding loop of cards 20 and 21.

Now that the desired checkerboard pattern is set into core (PP 103 memory), the hardware path must be established as well as readying the remote computer to receive the data. This is accomplished by the code associated with card No. 25. The function 2040, i.e., content of FUN, will be sent over the channel. Each digit of this function has special meaning to the hardware as follows:

| | |
|---|---|
| 2 | Synchronizer address |
| 0 | RCA address |
| 4 | Function desired (in this case 4 = Write data) |
| 0 | LCU address |

When the above-mentioned function is received properly by the hardware, the data path is established and the remote computer 25 is ready to receive the data (checkerboard). If, for some reason, an error occurs on this step, the QUEST user will be informed and the function will be issued again. Note that the second argument of card No. 25 is the error transfer and in this case it is back to itself (statement number 25).

The next step is to actually output the data (checkerboard). This is accomplished by the code associated with card No. 26. There will be 62 (LIM) words output from the array called DATA and if a hardware error occurs on this transmission, control will be passed to the code associated with card No. 25 (statement number 25).

The code associated with card 27 will pass control to the beginning of the function—output sequence thus repeating the process indefinitely.

The code associated with card No. 28 marks the logical end of the QUEST user's program. If control is ever passed to this code, the job will abort or repeat depending on the above-mentioned loop option (LO).

Card No. 29 is an end-of-file indicator. It informs the 6600 operating system that this is the logical end of this job.

While the above has described one embodiment of this invention, involving the described MACRO, it will be understood that this invention also contemplates another embodiment, comprising a procedure for adding new (or additional) MACROS. The method of this embodiment is illustrated as follows in TABLE XXIV:

PROCEDURE FOR ADDING NEW MACROS

I. General steps

1. Insert the name of the macro at the end of the "available functions" table (AVFN) in right justified display code.
2. Insert a jump to the section that will process the macro at the end of the PHASE 3 section (Table OP). The format of this is as follows:

```
TABLE XX        JP        PF XX
Note: XX will be used to denote a two
      digit number.
```

3. Insert the actual macro processor (see section II) with a PFXX (from step 2) as its entry name. Each "processor" section will depend on the particular action needed by that particular macro, but all have some common properties and restrictions:
   a. Address register A1 contains the address minus one of the table that contains the macro arguments in order (ARGA). (At this point these arguments are in display code).
   b After "processing," address register A1 must be set to the address of the first word of the raw code and a return jump to CSTOR executed. This will transfer the raw code to a special buffer and list the mnemonics if called for.
4 Insert the actual raw code macro in the data section of COMPI. Each word of this macro must conform to the following format:

| 12 bits | 36 bits | | 12 bits |
|---|---|---|---|
| RELOCATION DIRECTIVE | MNEMONIC OF INSTRUCTION IN LEFT JUSTIFICATION DIS CODE | ACTUAL PP PLAY | ACTUAL PP INSTRUCTION IN OCTAL |

Indirect addressing is used for channel modification and inserting arguments into the raw code.

II. Macro processor tasks

1 Insert argument names (ARGA), transfer names and relocation directives into raw code.
   a. Put address labels in proper place in raw code.
   b. Insert entrys into indirect address table (ZZXX) using VFD 60/NNNNN where NNNNN is the label used in (a).
   c. Set address register A3 equal to the address of the first word of this entry (step b) and do successive return jumps to PVAR, PVARF, or PTR for variable, required variable or transfer table look-ups respectively. These three routines will cause the name of the variable or transfer to be put in the raw code as well as the proper relocation directive.
   d. If any macro arguments are the "not required" type, they must be set to their forfeit values initially in the raw code.
   This means they must be restored after the call to CSTOR to allow further use of the raw code.
   e. The final instruction in the macro processor is unconditional jump to COMPI.
   Note: all macros requiring channel modifications must do the following:
   a. Put address labels in the proper place in the raw code
   b. Insert an entry into the T XX table using VFD 60/CHXX where CHXX is the address label from (a).

NOTE

CHANGES TO AYN RESIDENT

When changes to the resident are necessary the following tables must match in content and order.

1 IN"COMPI" = PPTB (COMPI. 2456)
2 IN"AYN" = (JTAB (AYN. 7/5)

This invention has the advantage of providing computer apparatus for self-diagnosis of both hardware and software errors and/or malfunctions as a regular computer job without interrupting the operation of the computer for any of a plurality of other regular computer jobs. In one embodiment, this invention forms a shared-time computer system having diagnostic means for connecting with a central computer, innumerable new, complicated and/or experimental input – output devices, such as a plurality of remote computers, in an efficient, time-saving manner. In this regard, this invention has the advantage of providing an improved diagnostic for the Brooknet shared-time computer system at the Brookhaven National Laboratory, comprising improved hardware and a novel non-mental software package, called Quest. To this end, the invention has the particular advantage of operating and diagnosing computer hardware and non-mental software in central and remote locations by means of central diagnostic hardware, comprising a portion of the central memory of a specific central processing unit having two peripheral processors forming small computer control units for each other and the central processing unit. Also, a specific diagnostic, comprising a unique Quest software package is provided having three specific non-mental programs for operation exclusively by a central shared-time computer system.

What is claimed is:

1. A time-sharing computer system having central and remote input - output means, comprising a central scientific computer facility having central processing means forming a central memory and means for performing various arithmetical and logical operations, and a plurality of peripheral processor means for providing small computer control units for said central processing means with equal power to provide and destroy information and commands for execution in each of said peripheral processor means and said central processing means for connecting said central processing means with said remote input - output means for communications therebetween on a regular, time-sharing job basis, said remote input - output devices, comprising at least one computer for connection to said central processing means on a regular, time-sharing job basis by said peripheral processor means, and at least two of said peripheral processor means forming with a portion of said memory a diagnostic means for diagnosing errors and malfunctions in said communications between said central processing means and said remote input - output means for preventing malfunctions in said peripheral processor means exclusively by said central scientific computer facility as a regular job without dedicating said central scientific computer facility to said diagnostic means for quickly and efficiently connecting said central processing means and said remote input - output means for quickly and efficiently providing said time-sharing computer system for providing said communications between said central and remote input - output means for trouble-free operation.

2. Method of testing and diagnosing the communication and failures of communication between a computer and an input - output means, comprising the active on-line steps of:

a. selectively transmitting information between said means and said computer as a first job by means of a first portion of said computer without dedicating the entire computer to said first job; and b. recording said selective transmission and said failures of said transmission as part of said first job by means of said first portion of said computer without dedicating the entire computer to said first job; said computer again selectively the dedication of c. said first portion of said computer being responsive to said failures for activating a second portion of said computer as a part of said first job for removing said failure without dedicating the entire computer to said first job whereby said first portion of said computer again selectively transmits said information without the dedication of the entire computer to said first job.

3. Method of diagnosing and testing the communication between any device, for generating or receiving input and/or output signals and a computer comprising the active on-line steps of:

a. selectively transmitting information between said device and said computer through a portion of said computer; and b. recording said transmissions including failures thereof by means of said portion of said computer;

c. said portion of said computer being responsive to said failure for activating another portion of said computer for removing said failure whereby said first portion of said computer again continues said selective transmission of said information without dedicating the entire computer to any of these tasks.

4. The invention of claim 3 in which said failure removal is controlled by said first portion of said computer for the repetition and termination of said method in a predetermined time.

5. Method of testing the transmissions to and from a computer for diagnosing the failures of communications to and from the computer and another device, such as a remote signal generating and receiving means, comprising the active on-line steps of:

a. continuously employing a first portion of said computer to the first task of selectively transmitting said communications between said device and said computer without dedicating the entire computer to said first task;

b. continuously employing said first portion of said computer to the second task of recording said transmissions without dedicating the entire computer to said second task;

c. continuously employing said first portion of said computer to the third task of recording said failures of communications without dedicating the entire computer to said third task; and d. continuously employing said first portion of said computer to the fourth task of activating a second portion of said computer for identifying said failures of said communications without dedicating the entire computer to said fourth task; said first portion of said computer being responsive to said recording of said failures of said communications for repeatedly activating said second portion of said computer for repeating said task for removing the same without dedicating the entire computer thereto.

6. Method of operating a computer until a blockage develops, and then reducing the blockage in an orderly manner for determining what the blockage was and where it was located without tying up the whole computer, said computer having a central processor, a plurality of peripheral processors, and a plurality of data channels connected thereto, comprising the active online step of selectively connecting said central processor with at least one of said peripheral processors and a signal generating station by monitoring means responsive to a program for monitoring the peripheral processors, said monitoring means being responsive to an invalid response from said signal generating station for selectively connecting said central processor with another peripheral processor for removing said invalid response.

7. The invention of claim 6 in which said second peripheral processor dumps the information in said first peripheral processor in an orderly manner while logging the same for locating the source of said invalid response.

8. Data processing system, consisting of central processing means having a central processing unit and peripheral processing means for communicating with a plurality of remote input - output means for exclusively, automatically, and non-mentally scheduling and simultaneously self-operating a plurality of regular computer jobs, comprising the diagnosis of failures in the communication between at least one of said peripheral processing means, said central processing unit and one of said remote input - output means while said central processing unit, other of said peripheral processing means, and other of said remote input - output means are in communication for the performance of other regular computer jobs.

9. In a central computer connected to a remote input - output device that is coupled to at least one of a plurality of data channels for communication of binary, electrical, input - output signals between said central computer and said remote device, said central computer having a central processor and peripheral processors for controlling the communication of said binary, electrical, input - output signals in the form of commands and responses between said central processor and said remote input - output device by selectively coupling at least one of said data channels between at least one of said peripheral processors and said central processor, said one of said peripheral processors becoming inoperative to perform its control function for said communication in response to an invalid response from said remote input - output device, the method of analyzing the functional integrity of said remote input - output device coupled to said one of said plurality of data channels, comprising the step of providing for said central processor a first, stored, non-mental program that monitors the state of said first one of said peripheral processors coupled to said one of said data channels, activates a second, stored, non-mental program in said first one of said peripheral processors, for providing checks on the validity of the commands to the remote input - output device and also the validity of the responses of said remote input –output device, and when said first of said peripheral processors becomes inoperative in response to an invalid response from said remote input - output device then couples a second one of said peripheral processes to said one of said plurality of data channels and activates a third, stored, non-mental program in said second one of said peripheral processors for restoring the functional ability of said first one of said peripheral processors, to couple said central processor across said one of said data channels to said remote input - output device for the communication of said commands and response therebetween, whereby said central computer retains its normal functional integrity independent of the functional integrity of said remote input - output device.

10. The method of claim 9, comprising the step of effecting time based checks on the validity of the responses of said remote input - output device in accordance with the state of said remote input - output device for providing sequential time-based output information on the state of said remote input - output device.

* * * * *